United States Patent
Liu et al.

(10) Patent No.: US 11,563,533 B2
(45) Date of Patent: Jan. 24, 2023

(54) UPLINK FREQUENCY HOPPING IN UNLICENSED FREQUENCY BAND

(71) Applicant: QUALCOMM Incorporated, San Diego, CA (US)

(72) Inventors: Chih-Hao Liu, San Diego, CA (US); Yisheng Xue, San Diego, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 17/081,405

(22) Filed: Oct. 27, 2020

(65) Prior Publication Data

US 2021/0160023 A1     May 27, 2021

Related U.S. Application Data

(60) Provisional application No. 62/940,145, filed on Nov. 25, 2019.

(51) Int. Cl.
*H04W 4/00* (2018.01)
*H04L 5/00* (2006.01)
(Continued)

(52) U.S. Cl.
CPC .......... *H04L 5/0012* (2013.01); *H04W 4/70* (2018.02); *H04W 16/14* (2013.01); *H04W 48/08* (2013.01); *H04W 74/0808* (2013.01)

(58) Field of Classification Search
CPC ...... H04L 5/0012; H04W 4/70; H04W 16/14; H04W 48/08; H04W 74/0808
(Continued)

(56) References Cited

U.S. PATENT DOCUMENTS 5,638,399 A * 6/1997 Schuchman ....... H04B 7/18576
370/320
6,047,015 A * 4/2000 Watanabe .............. H04B 1/692
375/132
(Continued)

FOREIGN PATENT DOCUMENTS

WO    WO-2018042371 A1    3/2018
WO    WO-2018106658 A1    6/2018
(Continued)

OTHER PUBLICATIONS

Huawei, et al., "Transmission with Configured Grant for NR-U", 3GPP TSG-RAN WG2 Meeting 105bis, 3GPP Draft; R2-1904958 Transmission with Configured Grant for NR-U, 3rd Generation Partnership Project (3GPP), Mobile Competence Centre; 650, Route Des Lucioles; F-06921 Sophia-Antipolis Cedex; FRA, vol. RAN WG2, No. Xian, China; Apr. 8, 2019-Apr. 12, 2019, Apr. 6, 2019 (Apr. 6, 2019), 5 Pages, XP051702237, Retrieved from the Internet: URL: http://www.3gpp.org/ftp/Meetings%5F3GPP%5FSYNC/RAN2/Docs/R2%2D1904958%2Ezip [retrieved on Apr. 6, 2019] p. 3, paragraph 2.2.

(Continued)

*Primary Examiner* — Mark G. Pannell
(74) *Attorney, Agent, or Firm* — Arun Swain; Holland & Hart LLP

(57) ABSTRACT

This disclosure provides systems, methods and apparatus, including computer programs encoded on computer storage media, for narrowband communications using frequency hopping in an unlicensed frequency band. In some implementations, a base station (BS) may transmit downlink (DL) data using a sequence of DL hopping frames on a corresponding sequence of unique hopping channels associated with a DL frequency hopping pattern. In some implementations, each user equipment (UE) of one or more UEs may transmit uplink (UL) data using a sequence of UL hopping (Continued)

frames on a corresponding sequence of unique hopping channels associated with a different UL frequency hopping pattern.

30 Claims, 18 Drawing Sheets

(51) Int. Cl.
*H04W 4/70* (2018.01)
*H04W 74/08* (2009.01)
*H04W 48/08* (2009.01)
*H04W 16/14* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2005/0143123 | A1* | 6/2005 | Black | H04W 16/14 455/414.3 |
| 2005/0232135 | A1* | 10/2005 | Mukai | H04L 25/0226 370/294 |
| 2005/0272432 | A1* | 12/2005 | Ji | H04W 72/082 455/449 |
| 2006/0013285 | A1* | 1/2006 | Kobayashi | H04B 1/7143 375/E1.035 |
| 2008/0165746 | A1* | 7/2008 | Sung | H04W 56/0045 370/337 |
| 2012/0069831 | A1* | 3/2012 | Miki | H04B 1/7143 375/E1.033 |
| 2014/0301351 | A1* | 10/2014 | Gao | H04W 16/14 370/329 |
| 2015/0270868 | A1* | 9/2015 | Park | H04W 28/0289 370/329 |
| 2016/0020822 | A1* | 1/2016 | Li | H04B 1/715 375/133 |
| 2016/0249327 | A1* | 8/2016 | Chen | H04L 5/0039 |
| 2016/0295345 | A1* | 10/2016 | Oh | H04W 72/042 |
| 2017/0070312 | A1* | 3/2017 | Yi | H04J 11/0069 |
| 2018/0020360 | A1 | 1/2018 | Verramalli et al. | |
| 2018/0309479 | A1* | 10/2018 | Yerramalli | H04L 5/001 |
| 2019/0029030 | A1* | 1/2019 | Zou | H04B 1/7143 |
| 2019/0037427 | A1* | 1/2019 | Yerramalli | H04W 36/0061 |
| 2019/0037525 | A1* | 1/2019 | Liu | H04L 5/0048 |
| 2019/0069319 | A1* | 2/2019 | Arshad | H04W 72/121 |
| 2019/0173611 | A1* | 6/2019 | Liu | H04L 1/0013 |
| 2019/0296790 | A1* | 9/2019 | Ye | H04L 1/0038 |
| 2020/0052828 | A1* | 2/2020 | Wang | H04L 1/1819 |
| 2020/0053782 | A1* | 2/2020 | Zhang | H04L 5/0051 |
| 2020/0092913 | A1* | 3/2020 | Xu | H04W 48/16 |
| 2020/0146034 | A1* | 5/2020 | Bagheri | H04L 1/1822 |
| 2020/0178297 | A1* | 6/2020 | Park | H04W 72/0446 |
| 2020/0220673 | A1* | 7/2020 | Chang | H04W 16/14 |
| 2020/0220682 | A1* | 7/2020 | Li | H04L 5/0048 |
| 2020/0229213 | A1* | 7/2020 | Han | H04W 16/14 |
| 2021/0127328 | A1* | 4/2021 | Liu | H04W 74/0808 |
| 2021/0298090 | A1* | 9/2021 | Myung | H04W 74/0808 |

FOREIGN PATENT DOCUMENTS

| | | |
|---|---|---|
| WO | WO-2018144942 A1 | 8/2018 |
| WO | WO-2018204629 A1 | 11/2018 |
| WO | WO-2019034524 A1 | 2/2019 |

OTHER PUBLICATIONS

Partial International Search Report—PCT/US2020/057621—ISA/EPO—dated Feb. 19, 2021.
Qualcomm Incorporated: "RLM and Link Recovery Procedure in NR-U", 3GPP TSG-RAN WG4 Meeting #93, 3GPP Draft; R4-1914989, 3rd Generation Partnership Project (3GPP), Mobile Competence Centre; 650, Route Des Lucioles; F-06921 Sophia-Antipolis Cedex; France, vol. RAN WG4, No. Reno, Nevada; Nov. 18, 2019-Nov. 22, 2019, Nov. 8, 2019 (Nov. 8, 2019), 5 Pages, XP051819268, Retrieved from the Internet: URL: https://ftp.3gpp.org/tsg_ran/WG4_Radio/TSGR4_93/Docs/R4-1914989.zip [retrieved on Nov. 8, 2019] p. 3, paragraph 3.
VIVO: "Discussion on Physical DL Channel Design in Unlicensed Spectrum", 3GPP TSG RAN WG1 Meeting #95, 3GPP Draft; R1-1812298 Discussion on Physical DL Channel Design in Unlicensed Spectrum, 3rd Generation Partnership Project (3GPP), Mobile Competence Centre; 650, Route Des Lucioles; F-06921 Sophia-A, vol. RAN WG1, No. Spokane, US; Nov. 12, 2018-Nov. 16, 2018, Nov. 11, 2018 (Nov. 11, 2018), 5 Pages, XP051554203, Retrieved from the Internet: URL: http://www.3gpp.org/ftp/Meetings%5F3GPP%5FSYNC/RAN1/Docs/RI%2D1812298%2Ezip [retrieved on Nov. 11, 2018] paragraph [02.2].
International Search Report and Written Opinion—PCT/US2020/057621—ISA/EPO—dated Apr. 12, 2021.

* cited by examiner

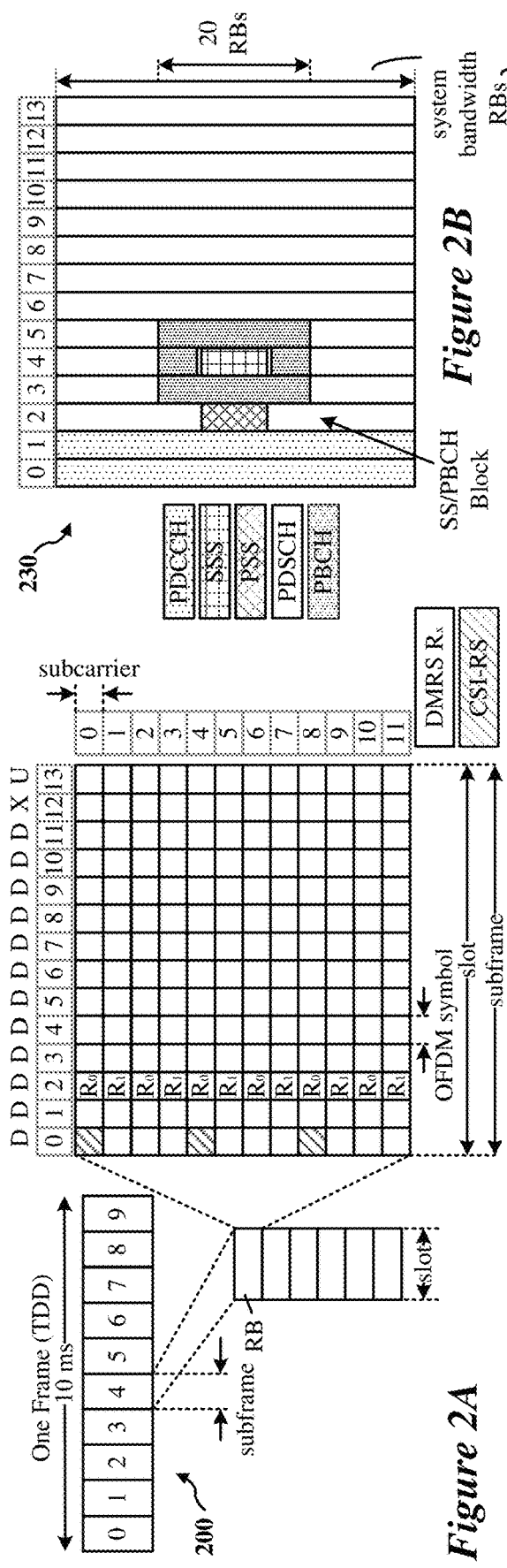
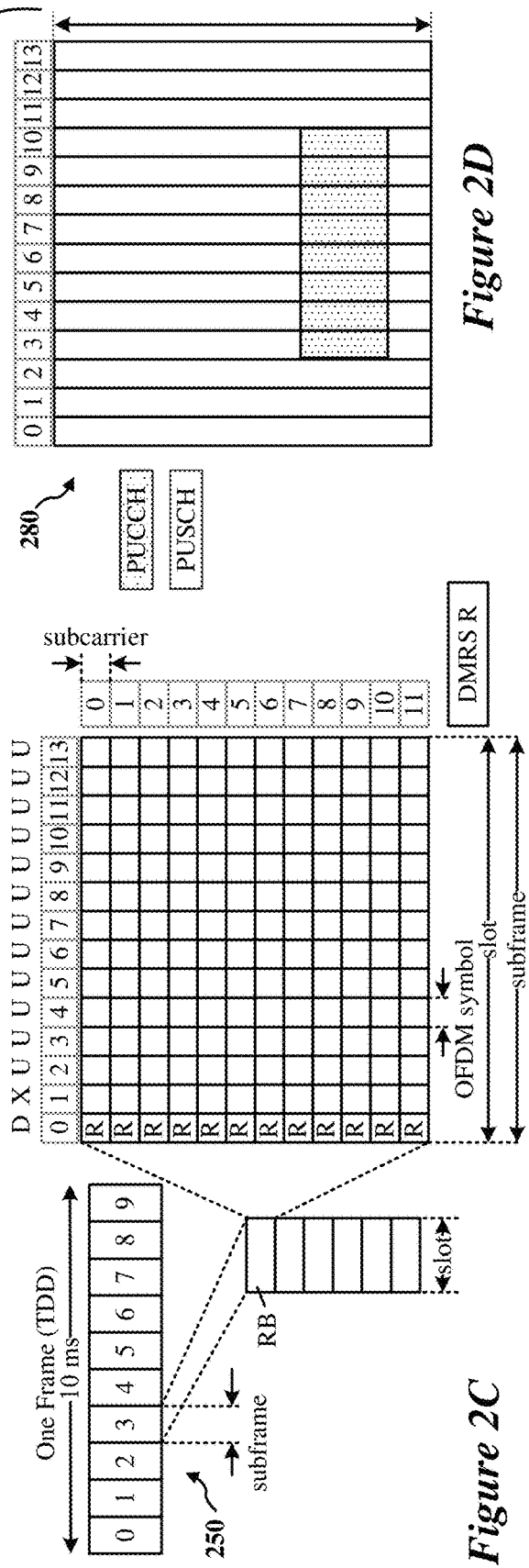
Figure 2A
Figure 2B
Figure 2C
Figure 2D

UPLINK FREQUENCY HOPPING IN UNLICENSED FREQUENCY BAND

CROSS-REFERENCE TO RELATED APPLICATIONS

This Patent Application claims priority to U.S. Provisional Patent Application No. 62/940,145 entitled "UPLINK FREQUENCY HOPPING IN UNLICENSED FREQUENCY BAND" and filed on Nov. 25, 2019, which is assigned to the assignee hereof. The disclosures of all prior Applications are considered part of and are incorporated by reference in this Patent Application.

TECHNICAL FIELD

This disclosure relates generally to wireless communications, and more specifically to narrowband frequency hopping in unlicensed radio bands.

DESCRIPTION OF THE RELATED TECHNOLOGY

Wireless communications systems are capable of supporting communications with multiple users by sharing portions of a system bandwidth using a multiple-access technology such as code division multiple access (CDMA) systems, time division multiple access (TDMA) systems, frequency division multiple access (FDMA) systems, and orthogonal frequency division multiple access (OFDMA) systems (such as a Long Term Evolution (LTE) system or a Fifth Generation (5G) New Radio (NR) system). A wireless multiple-access communications system may include a number of base stations or access network nodes, each simultaneously supporting communication for multiple communication devices, which may be otherwise known as user equipment (UE).

These multiple access technologies have been adopted in various telecommunication standards to provide a common protocol that enables different wireless devices to communicate on a municipal, national, regional, and even global level. An example telecommunication standard is 5G New Radio (NR). There exists a need for further improvements in 5G NR technology. These improvements also may be applicable to other multi-access technologies and the telecommunication standards that employ these technologies.

SUMMARY

The systems, methods and devices of this disclosure each have several innovative aspects, no single one of which is solely responsible for the desirable attributes disclosed herein.

One innovative aspect of the subject matter described in this disclosure can be implemented as a method for wireless communication. The method may be performed by an apparatus of a user equipment (UE), and may include receiving a discovery reference signal (DRS) indicating a downlink (DL) frequency hopping pattern. The method also may include selecting an uplink (UL) frequency hopping pattern. The method also may include detecting a signal indicating a channel occupancy time (COT) obtained by a base station on a first hopping channel of the DL frequency hopping pattern. The method also may include receiving DL data on the first hopping channel of the DL frequency hopping pattern. The method also may include transmitting UL data on a first hopping channel of the UL frequency hopping pattern. In some implementations, the UE may receive the DL data on the first hopping channel of the DL frequency hopping pattern concurrently with transmitting the UL data on the first hopping channel of the UL frequency hopping pattern. In some instances, the first hopping channel of the UL frequency hopping pattern may be configured to carry time-multiplexed UL data or frequency-multiplexed UL data transmitted from the UE and from one or more other UEs during a first COT period.

In some implementations, the selection of the UL frequency hopping pattern may be based on the DL frequency hopping pattern and at least one of a cell identifier, a user equipment identifier (UE ID), or a group UE identifier. In some instances, the at least one of the cell identifier, the UE ID, or the group UE identifier may be received in one or more of a radio resource control (RRC) configuration, a downlink control information (DCI) message, or the DRS. In some other implementations, the DL frequency hopping pattern may be a cell-specific frequency hopping pattern, and selecting the UL frequency hopping pattern may include applying a constant offset in modulo to the DL frequency hopping pattern. In some other implementations, the DL frequency hopping pattern may be a cell-specific frequency hopping pattern, and the UL frequency hopping pattern may be based on the DL frequency hopping pattern, a user equipment identifier (UE ID), and a slot index.

In some implementations, the DRS also may include one or more of a primary synchronization signal (PSS), a secondary synchronization signal (SSS), a physical broadcast channel (PBCH), a system information block (SIB), a slot format indicator (SFI), or remaining minimum system information (RMSI). In some instances, the DRS may be received over an anchor channel, and the DRS may have a dwell time on the anchor channel based on one or more of the 3GPP standards. In some implementations, each of the DL frequency hopping pattern and the UL frequency hopping pattern may include at least 15 unique hopping channels, and each of the at least 15 unique hopping channels may have a dwell time based on one or more of the 3GPP standards.

In some implementations, the signal indicating the COT may be one or more of a system information channel occupancy time (SI-COT), a group-common physical downlink control channel (GC-PDCCH), or a common transmit preamble. In some instances, the COT may be obtained by the base station based on a clear channel assessment (CCA) procedure performed on the first hopping channel of the DL frequency hopping pattern.

In some implementations, the DL data may be received over one of a physical downlink shared channel (PDSCH) or a physical downlink control channel (PDCCH). In some other implementations, the UL data may be transmitted over one of a physical uplink shared channel (PUSCH) or a physical uplink control channel (PUCCH).

In some implementations, the method also may include transmitting at least a portion of the UL data using configured grant (CG) resources based on not detecting the signal within a time period.

Another innovative aspect of the subject matter described in this disclosure can be implemented in a user equipment (UE). The UE may include an interface configured to obtain a discovery reference signal (DRS) indicating a downlink (DL) frequency hopping pattern. The UE also may include a processing system configured to select an uplink (UL) frequency hopping pattern. The interface also may be configured to obtain a signal indicating a channel occupancy time (COT) obtained by a base station on a first hopping channel of the DL frequency hopping pattern. The interface also may be configured to obtain DL data on the first hopping channel of the DL frequency hopping pattern. The interface also may be configured to output UL data for transmission on a first hopping channel of the UL frequency hopping pattern. In some implementations, the UE may receive the DL data on the first hopping channel of the DL frequency hopping pattern concurrently with transmitting the UL data on the first hopping channel of the UL frequency hopping pattern. In some instances, the first hopping channel of the UL frequency hopping pattern may be configured to carry time-multiplexed UL data or frequency-multiplexed UL data transmitted from the UE and from one or more other UEs during a first COT period.

In some implementations, the selection of the UL frequency hopping pattern may be based on the DL frequency hopping pattern and at least one of a cell identifier, a user equipment identifier (UE ID), or a group UE identifier. In some instances, the at least one of the cell identifier, the UE ID, or the group UE identifier may be received in one or more of a radio resource control (RRC) configuration, a downlink control information (DCI) message, or the DRS. In some other implementations, the DL frequency hopping pattern may be a cell-specific frequency hopping pattern, and selecting the UL frequency hopping pattern may include applying a constant offset in modulo to the DL frequency hopping pattern. In some other implementations, the DL frequency hopping pattern may be a cell-specific frequency hopping pattern, and the UL frequency hopping pattern may be based on the DL frequency hopping pattern, a user equipment identifier (UE ID), and a slot index.

In some implementations, the DRS also may include one or more of a primary synchronization signal (PSS), a secondary synchronization signal (SSS), a physical broadcast channel (PBCH), a system information block (SIB), a slot format indicator (SFI), or remaining minimum system information (RMSI). In some instances, the DRS may be received over an anchor channel, and the DRS may have a dwell time on the anchor channel based on one or more of the 3GPP standards. In some implementations, each of the DL frequency hopping pattern and the UL frequency hopping pattern may include at least 15 unique hopping channels, and each of the at least 15 unique hopping channels may have a dwell time based on one or more of the 3GPP standards.

In some implementations, the signal indicating the COT may be one or more of a system information channel occupancy time (SI-COT), a group-common physical downlink control channel (GC-PDCCH), or a common transmit preamble. In some instances, the COT may be obtained by the base station based on a clear channel assessment (CCA) procedure performed on the first hopping channel of the DL frequency hopping pattern.

In some implementations, the DL data may be received over one of a physical downlink shared channel (PDSCH) or a physical downlink control channel (PDCCH). In some other implementations, the UL data may be transmitted over one of a physical uplink shared channel (PUSCH) or a physical uplink control channel (PUCCH).

In some implementations, the interface also may be configured to transmit at least a portion of the UL data using configured grant (CG) resources based on not detecting the signal within a time period.

Another innovative aspect of the subject matter described in this disclosure can be implemented as a method for wireless communication. The method may be performed by an apparatus of a base station (BS), and may include transmitting a discovery reference signal (DRS) over an unlicensed frequency band, the DRS indicating a downlink (DL) frequency hopping pattern. The method also may include selecting an uplink (UL) frequency hopping pattern. The method also may include transmitting a signal indicating a channel occupancy time (COT) obtained on a first hopping channel of the DL frequency hopping pattern. The method also may include transmitting DL data on the first hopping channel of the DL frequency hopping pattern. The method also may include receiving UL data on a first hopping channel of the UL frequency hopping pattern. In some implementations, the BS may transmit the DL data on the first hopping channel of the DL frequency hopping pattern concurrently with receiving the UL data on the first hopping channel of the UL frequency hopping pattern. In some instances, the first hopping channel of the UL frequency hopping pattern may be configured to carry time-multiplexed UL data or frequency-multiplexed UL data received from a plurality of different UEs during a first COT period.

In some implementations, the selection of the UL frequency hopping pattern may be based on the DL frequency hopping pattern and at least one of a cell identifier, a user equipment identifier (UE ID), or a group UE identifier. In some instances, the at least one of the cell identifier, the UE ID, or the group UE identifier may be provided to one or more UEs in one or more of a radio resource control (RRC) configuration, a downlink control information (DCI) message, or the DRS. In some other implementations, the DL frequency hopping pattern may be a cell-specific frequency hopping pattern, and selecting the UL frequency hopping pattern may include applying a constant offset in modulo to the DL frequency hopping pattern. In some other implementations, the DL frequency hopping pattern may be a cell-specific frequency hopping pattern, and the UL frequency hopping pattern may be based on the DL frequency hopping pattern, a user equipment identifier (UE ID), and a slot index.

In some implementations, the DRS also may include one or more of a primary synchronization signal (PSS), a secondary synchronization signal (SSS), a physical broadcast channel (PBCH), a system information block (SIB), a slot format indicator (SFI), or remaining minimum system information (RMSI). In some instances, the DRS may be transmitted over an anchor channel, and the DRS may have a dwell time on the anchor channel based on one or more of the 3GPP standards. In some implementations, each of the DL frequency hopping pattern and the UL frequency hopping pattern may include at least 15 unique hopping channels, and each of the at least 15 unique hopping channels may have a dwell time based on one or more of the 3GPP standards.

In some implementations, the signal indicating the COT may be one or more of a system information channel occupancy time (SI-COT), a group-common physical downlink control channel (GC-PDCCH), or a common transmit preamble. In some instances, the COT may be obtained based on a clear channel assessment (CCA) procedure performed on the first hopping channel of the DL frequency hopping pattern.

In some implementations, the DL data may be transmitted over one of a physical downlink shared channel (PDSCH) or a physical downlink control channel (PDCCH). In some other implementations, the UL data may be received over one of a physical uplink shared channel (PUSCH) or a physical uplink control channel (PUCCH).

In some implementations, the method also may include contending for access to the first hopping channel of the DL frequency hopping pattern using a clear channel assessment (CCA) procedure, and switching to another hopping channel of the DL frequency hopping pattern after a number of unsuccessful CCA procedures on the first hopping channel of the DL frequency hopping pattern. In some other implementations, the method also may include selecting a plurality of unique UL frequency hopping patterns, and allocating each unique UL frequency hopping pattern of the plurality of unique UL frequency hopping patterns to a respective user equipment (UE) of a plurality of UEs.

Another innovative aspect of the subject matter described in this disclosure can be implemented in a BS. The BS may include an interface configured to output a discovery reference signal (DRS) for transmission over an unlicensed frequency band, the DRS indicating a downlink (DL) frequency hopping pattern and an identifier. The interface also may be configured to output a signal indicating a channel occupancy time (COT) obtained on a first hopping channel of the DL frequency hopping pattern. The BS also may include a processing system configured to select an uplink (UL) frequency hopping pattern. The interface also may be configured to output DL data for transmission on the first hopping channel of the DL frequency hopping pattern, and to obtain UL data on a first hopping channel of the UL frequency hopping pattern. In some implementations, the BS may transmit the DL data on the first hopping channel of the DL frequency hopping pattern concurrently with receiving the UL data on the first hopping channel of the UL frequency hopping pattern. In some instances, the first hopping channel of the UL frequency hopping pattern may be configured to carry time-multiplexed UL data or frequency-multiplexed UL data received from a plurality of different UEs during a first COT period.

In some implementations, the selection of the UL frequency hopping pattern may be based on the DL frequency hopping pattern and at least one of a cell identifier, a user equipment identifier (UE ID), or a group UE identifier. In some instances, the at least one of the cell identifier, the UE ID, or the group UE identifier may be provided to one or more UEs in one or more of a radio resource control (RRC) configuration, a downlink control information (DCI) message, or the DRS. In some other implementations, the DL frequency hopping pattern may be a cell-specific frequency hopping pattern, and selecting the UL frequency hopping pattern may include applying a constant offset in modulo to the DL frequency hopping pattern. In some other implementations, the DL frequency hopping pattern may be a cell-specific frequency hopping pattern, and the UL frequency hopping pattern may be based on the DL frequency hopping pattern, a user equipment identifier (UE ID), and a slot index.

In some implementations, the DRS also may include one or more of a primary synchronization signal (PSS), a secondary synchronization signal (SSS), a physical broadcast channel (PBCH), a system information block (SIB), a slot format indicator (SFI), or remaining minimum system information (RMSI). In some instances, the DRS may be transmitted over an anchor channel, and the DRS may have a dwell time on the anchor channel based on one or more of the 3GPP standards. In some implementations, each of the DL frequency hopping pattern and the UL frequency hopping pattern may include at least 15 unique hopping channels, and each of the at least 15 unique hopping channels may have a dwell time based on one or more of the 3GPP standards.

In some implementations, the signal indicating the COT may be one or more of a system information channel occupancy time (SI-COT), a group-common physical downlink control channel (GC-PDCCH), or a common transmit preamble. In some instances, the COT may be obtained based on a clear channel assessment (CCA) procedure performed on the first hopping channel of the DL frequency hopping pattern.

In some implementations, the DL data may be transmitted over one of a physical downlink shared channel (PDSCH) or a physical downlink control channel (PDCCH). In some other implementations, the UL data may be received over one of a physical uplink shared channel (PUSCH) or a physical uplink control channel (PUCCH).

In some implementations, the interface also may be configured to contend for access to the first hopping channel of the DL frequency hopping pattern using a clear channel assessment (CCA) procedure, and switch to another hopping channel of the DL frequency hopping pattern after a number of unsuccessful CCA procedures on the first hopping channel of the DL frequency hopping pattern. In some other implementations, the interface also may be configured to select a plurality of unique UL frequency hopping patterns, and allocate each unique UL frequency hopping pattern of the plurality of unique UL frequency hopping patterns to a respective user equipment (UE) of a plurality of UEs.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 2A shows an example of a first 5G NR frame.

FIG. 2B shows example downlink (DL) channels within a 5G NR slot.

FIG. 2C shows an example of a second 5G NR frame.

FIG. 2D shows example uplink (UL) channels within a 5G NR slot.

Like reference numbers and designations in the various drawings indicate like elements.

DETAILED DESCRIPTION

Figure 1:
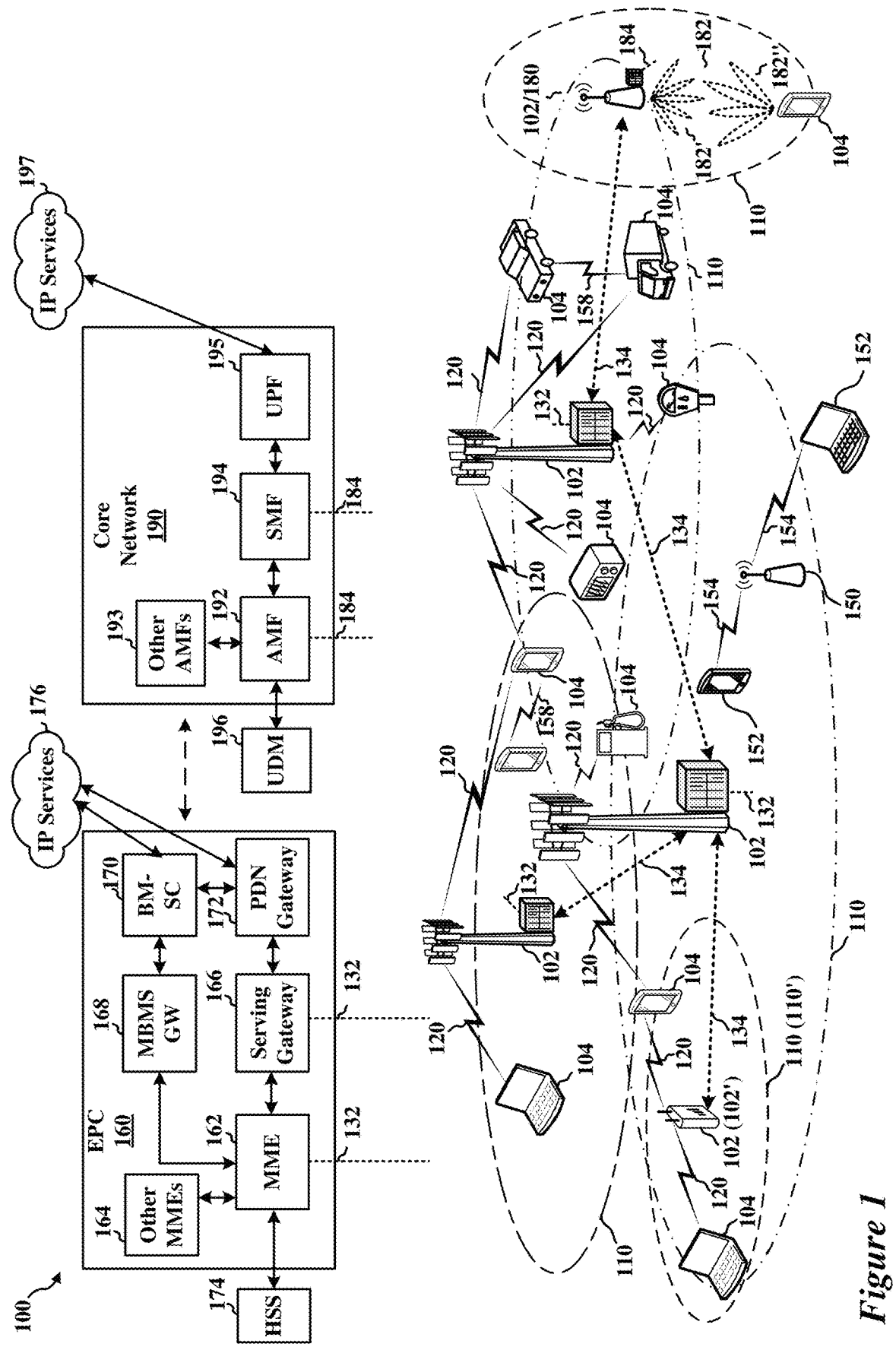
FIG. 1 shows a diagram illustrating an example wireless communications system and access network.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an Internet of things (IOT) network.

Implementations of the subject matter described in this disclosure may allow user equipments (UEs) and base stations (BSs) operating according to 5G NR protocols to exchange data and other information using narrowband communications with frequency hopping in an unlicensed frequency band. In accordance with some aspects of the present disclosure, a base station and a UE may exchange downlink (DL) data using a DL frequency hopping pattern concurrently with exchanging uplink (UL) data using an UL frequency hopping pattern. The DL frequency hopping pattern may include a first sequence of hopping channels, and the UL frequency hopping pattern may include a second sequence of hopping channels different than the first sequence of hopping channels. Each hopping channel of the first sequence of hopping channels may be associated with a corresponding DL hopping frame of a sequence of DL hopping frames, and each hopping channel of the second sequence of hopping channels may be associated with a corresponding UL hopping frame of a sequence of UL hopping frames. In some implementations, each hopping channel of the first sequence of hopping channels may be separated from a corresponding hopping channel of the second sequence of hopping channels by a gap frequency configured or selected to reduce interference between DL and UL transmissions.

In some implementations, the base station may transmit, on an anchor channel of a frequency spectrum, a discovery reference signal (DRS) indicating at least one of the DL frequency hopping pattern or the UL frequency hopping pattern. After transmission of the DRS, the base station and the UE may move to a first hopping channel of the DL frequency hopping pattern. The base station may contend for medium access on the first hopping channel using a clear channel assessment (CCA) procedure, and may transmit a signal indicating a channel occupancy time (COT) obtained by the base station on the first hopping channel of the DL frequency hopping pattern. The UE may detect the signal, and may receive DL data on the first hopping channel of the DL frequency hopping pattern concurrently with transmitting UL data on a first hopping channel of the UL frequency hopping pattern. If the UE does not detect the signal within a time period (such as because the base station did not obtain a COT on the first DL hopping channel), the UE may transmit at least a portion of the UL data using configured grant (CG) resources.

In some implementations, a UE may be configured to operate as a full-duplex device, and the DL and UL frequency hopping patterns may be based on the same cell-specific frequency hopping pattern such that each DL hopping channel of the DL frequency hopping pattern is separated from a corresponding UL hopping channel of the UL frequency hopping pattern by a gap frequency. The resulting frequency hopping configuration may allow the UE to receive DL data on each DL hopping channel concurrently with transmitting UL data on a corresponding UL hopping channel. In some other implementations, a plurality of UEs may be configured to operate as half-duplex devices, and each of the plurality of UEs may be allocated or assigned a different UL frequency hopping pattern. In this manner, multiple UEs may concurrently transmit UL data using a multitude of different UL hopping channels.

Particular implementations of the subject matter described in this disclosure can be implemented to realize one or more of the following potential advantages. The ability of base stations and UEs to communicate with each other using narrowband communications in an unlicensed frequency band may improve channel access because there may be less contention on relatively small frequency bands (such as the hopping channels associated with the DL and UL frequency hopping patterns) than on relatively large frequency bands (such as primary channels used in wideband communications). Unlicensed frequency bands may be more ubiquitous than licensed portions of the radio frequency (RF) spectrum, and therefore narrowband communications performed in one or more unlicensed frequency bands may provide better coverage for wireless communication devices (such as base stations and UEs) than communications performed solely on licensed portions of the RF spectrum. Further, employing frequency hopping techniques in narrowband communications on one or more unlicensed frequency bands may reduce interference from other wireless communication devices operating on unlicensed frequency bands by exploiting the frequency diversity of the unlicensed frequency bands.

In some implementations for which a UE operates as a full-duplex device, the ability to receive DL data on a DL hopping channel while concurrently transmitting UL data on an UL hopping channel may increase DL and UL throughput (such as compared with UEs that operate as half-duplex devices). In some other implementations for which UEs operate as half-duplex devices or for which UL throughput is more important than DL throughput, allocating different UL frequency hopping patterns to different UEs may allow multiple UEs to concurrently transmit UL data, thereby increasing UL throughput. In some implementations, the different UL frequency hopping patterns may be uncoordinated relative to each other in order to avoid certain restrictions on communications that employ frequency hopping techniques. In some other implementations, the different UL frequency hopping patterns may be coordinated relative to each other to reduce collisions on a shared wireless medium.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system 100. The wireless communications system 100 includes base stations 102, UEs 104, an Evolved Packet Core (EPC) 160, and another core network 190 (such as a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (such as the S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (such as handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (such as through the EPC 160 or core network 190) with each other over backhaul links 134 (such as the X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network also may include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104 may use spectrum up to Y MHz (such as 5 MHz, 10 MHz, 15 MHz, 20 MHz, 100 MHz, 400 MHz, etc.) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (such as more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to or increase capacity of the access network.

A base station 102, whether a small cell 102' or a large cell (such as a macro base station), may include an eNB, gNodeB (gNB), or another type of base station. Some base stations, such as gNB 180, may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (such as between 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 also may transmit a beamformed signal to the base station 180 in one or more transmit directions. The base station 180 may receive the beamformed signal from the UE 104 in one or more receive directions. The base station 180 and UE 104 may perform beam training to determine the best receive and transmit directions for each of the base station 180 and UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting MBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station also may be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (such as an MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (such as a parking meter, gas pump, toaster, vehicles, heart monitor, etc.). The UE 104 also may be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The wireless communications system 100 may utilize both licensed and unlicensed radio frequency spectrum bands. For example, the wireless system 100 may employ LTE License Assisted Access (LTE-LAA), LTE Unlicensed (LTE U) radio access technology, or 5G NR technology in an unlicensed radio band (such as the 5 GHz Industrial, Scientific, and Medical (ISM) band or the 6 GHz UNIT bands). When operating in unlicensed radio bands, wireless communication devices (such as the base stations 102 and UEs 104) may employ listen-before-talk (LBT) channel access mechanisms to ensure the channel is clear before transmitting data. In some instances, operations in unlicensed radio bands may be based on a carrier aggregation (CA) configuration in conjunction with component carriers (CCs) operating in a licensed band. Operations in unlicensed radio bands may include downlink transmissions, uplink transmissions, or both. Duplexing in unlicensed radio bands may be based on frequency division duplexing (FDD), time division duplexing (TDD) or a combination of both.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. In some cases, the 5G/NR frame structure may be FDD in which, for a particular set of subcarriers (carrier system bandwidth), slots within the set of subcarriers are dedicated for either DL or UL transmissions. In other cases, the 5G/NR frame structure may be TDD in which, for a particular set of subcarriers (carrier system bandwidth), slots within the set of subcarriers are dedicated for both DL and UL transmissions. In the examples shown in FIGS. 2A and 2C, the 5G/NR frame structure is based on TDD, with slot 4 configured with slot format 28 (with mostly DL), where D indicates DL, U indicates UL, and X indicates that the slot is flexible for use between DL and UL, and with slot 3 configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs may be configured with the slot format, either dynamically through downlink control information (DCI) or semi-statically through radio resource control (RRC) signaling by a slot format indicator (SFI). The configured slot format also may apply to a 5G/NR frame structure that is based on FDD.

Other wireless communication technologies may have a different frame structure or different channels. A frame may be divided into a number of equally sized subframes. For example, a frame having a duration of 10 microseconds (μs) may be divided into 10 equally sized subframes each having a duration of 1 μs. Each subframe may include one or more time slots. Subframes also may include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (such as for high throughput scenarios) or discrete Fourier transform (DFT) spread OFDM (DFT-s-OFDM) symbols (also referred to as single carrier frequency-division multiple access (SC-FDMA) symbols) (such as for power limited scenarios).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols per slot and $2^\mu$ slots per subframe. The subcarrier spacing and symbol length/duration are a function of the numerology. The subcarrier spacing may be equal to $2^\mu * 15$ kHz, where μ is the numerology 0 to 5. As such, the numerology μ=0 has a subcarrier spacing of 15 kHz, and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 microseconds (μs).

A resource grid may be used to represent the frame structure. Each time slot includes a resource block (RB) (also referred to as a physical RB (PRB)) that extends across 12 consecutive subcarriers and across a number of symbols. The intersections of subcarriers and across 14 symbols. The intersections of subcarriers and of the RB define multiple resource elements (REs). The number of bits carried by each RE depends on the modulation scheme.

As illustrated in FIG. 2A, some of the REs carry a reference signal (RS) for the UE. In some configurations, one or more REs may carry a demodulation reference signal (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs also may include a beam measurement reference signal (BRS), a beam refinement reference signal (BRRS), and a phase tracking reference signal (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
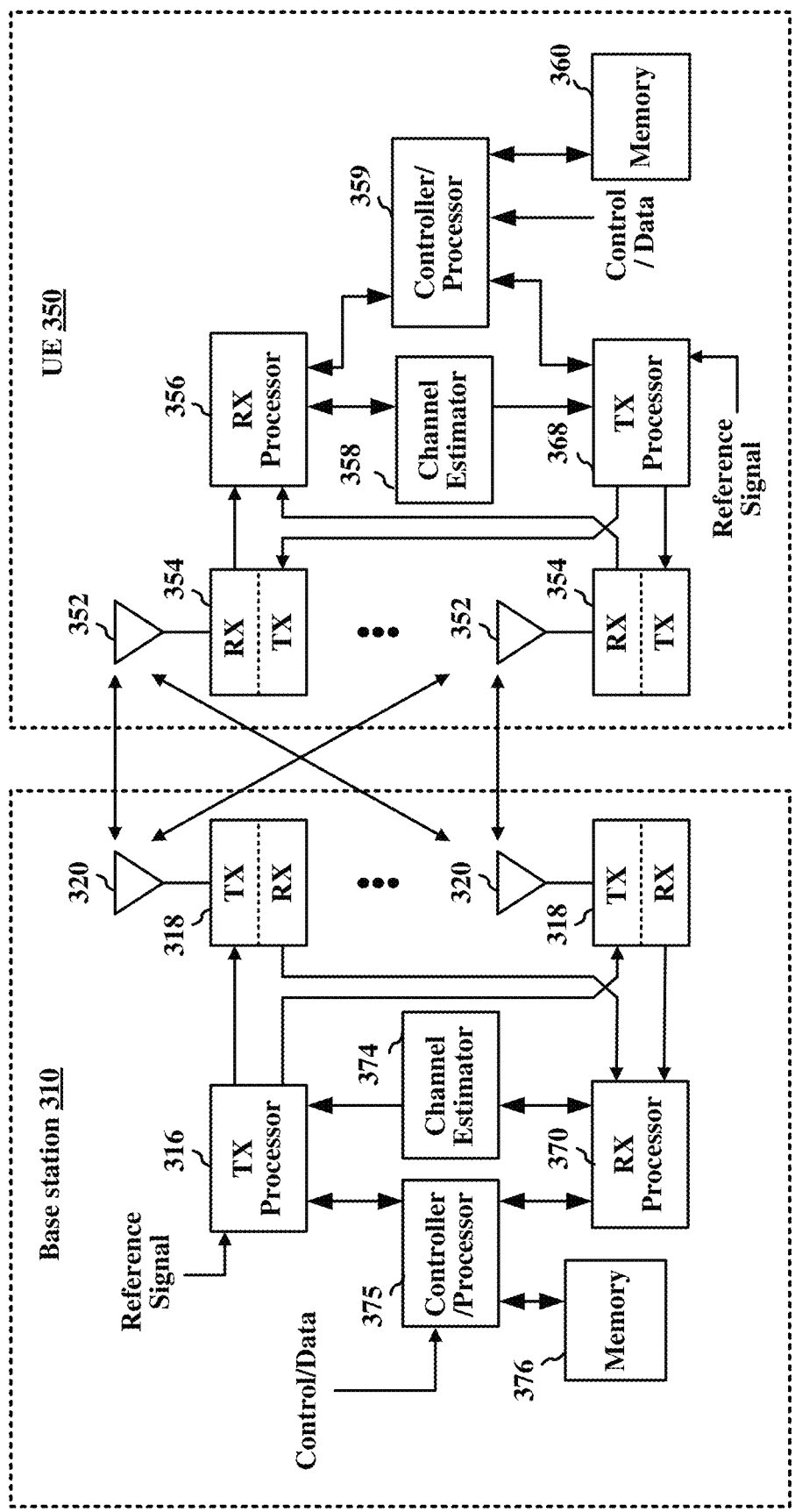
FIG. 3 shows a diagram illustrating an example base station and user equipment (UE) in an access network.

FIG. 3 shows a block diagram of an example base station 310 and UE 350 in an access network. In the DL, IP packets from the EPC 160 may be provided to a controller/processor 375 of the base station 310. The controller/processor 375 may implement layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 also may provide RRC layer functionality associated with broadcasting of system information (such as the MIB and SIBs), RRC connection control (such as RRC connection paging, RRC connection establishment, RRC connection modification, and RRC connection release), inter radio access technology (RAT) mobility, and measurement configuration for UE measurement reporting. The controller/processor 375 also may provide PDCP layer functionality associated with header compression/decompression, security (such as ciphering, deciphering, integrity protection, integrity verification), and handover support functions. The controller/processor 375 also may provide RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs. The controller/processor 375 also may provide MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

In some implementations, controller/processor 375 may be a component of a processing system. A processing system may generally refer to a system or series of machines or components that receives inputs and processes the inputs to produce a set of outputs (which may be passed to other systems or components of, for example, the base station 310). For example, a processing system of the base station 310 may refer to a system including the various other components or subcomponents of the base station 310.

The processing system of the base station 310 may interface with other components of the base station 310, and may process information received from other components (such as inputs or signals), output information to other components, and the like. For example, a chip or modem of the base station 310 may include a processing system, a first interface to receive or obtain information, and a second interface to output, transmit or provide information. In some instances, the first interface may refer to an interface between the processing system of the chip or modem and a receiver, such that the base station 310 may receive information or signal inputs, and the information may be passed to the processing system. In some instances, the second interface may refer to an interface between the processing system of the chip or modem and a transmitter, such that the base station 310 may transmit information output from the chip or modem. A person having ordinary skill in the art will readily recognize that the second interface also may obtain or receive information or signal inputs, and the first interface also may output, transmit or provide information.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may be split into parallel streams. Each stream may be mapped to an OFDM subcarrier, multiplexed with a reference signal (such as a pilot signal) in the time or frequency domain, and combined together using an Inverse Fast Fourier Transform (IFFT) to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are decoded and deinterleaved to recover the data and control signals that were originally transmitted by the base station 310 on the physical channel. The data and control signals are provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 of the UE 350 provides RRC layer functionality associated with system information (such as the MIB and SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

In some implementations, the controller/processor 359 may be a component of a processing system. A processing system may generally refer to a system or series of machines or components that receives inputs and processes the inputs to produce a set of outputs (which may be passed to other systems or components of the UE 350). For example, a processing system of the UE 350 may refer to a system including the various other components or subcomponents of the UE 350.

The processing system of the UE 350 may interface with other components of the UE 350, and may process information received from other components (such as inputs or signals), output information to other components, and the like. For example, a chip or modem of the UE 350 may include a processing system, a first interface to receive or obtain information, and a second interface to output or transmit information. In some instances, the first interface may refer to an interface between the processing system of the chip or modem and a receiver, such that the UE 350 may receive information or signal inputs, and the information may be passed to the processing system. In some instances, the second interface may refer to an interface between the processing system of the chip or modem and a transmitter, such that the UE 350 may transmit information output from the chip or modem. A person having ordinary skill in the art will readily recognize that the second interface also may obtain or receive information or signal inputs, and the first interface also may output, transmit or provide information.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations. Information to be wirelessly communicated (such as for LTE or NR based communications) is encoded and mapped, at the PHY layer, to one or more wireless channels for transmission.

In the example of FIG. 3, each antenna 352 of the UE 350 is coupled to a respective transmitter 354TX. In some other implementations, some UEs may have fewer transmitters (or transmit chains) than receive (RX) antennas. Although not shown for simplicity, each transmitter may be coupled to a respective power amplifier (PA) which amplifies the signal to be transmitted. The combination of a transmitter with a PA may be referred to herein as a "transmit chain" or "TX chain." To save on cost or die area, the same PA may be reused to transmit signals over multiple RX antennas. In other words, one or more TX chains of a UE may be switchably coupled to multiple RX antennas ports.

Narrowband communications involve communicating with a limited frequency bandwidth (such as compared to wideband communications typically used by cellular and Wi-Fi devices), and may be implemented in an unlicensed frequency band. An unlicensed frequency band may refer to a radio-frequency (RF) band that is open for shared use by any device that complies with regulatory agency rules for communicating via the RF band. In some implementations, the unlicensed frequency band may include one or more radio frequencies in the 5 GHz band (such as the UNII frequency bands between approximately 5.15 GHz and approximately 5.825 GHz). In some other implementations, the unlicensed frequency band may include one or more radio frequencies in the 2.4 GHz band (such as radio frequencies between approximately 2.4 GHz and 2.48 GHz typically used by Wi-Fi devices and wireless networks). In some other implementations, the unlicensed frequency band may include one or more radio frequencies in the 6 GHz band.

In contrast to most licensed RF bands, users of unlicensed frequency bands typically do not have regulatory protection against radio interference from devices of other users, and may be subject to radio interference caused by other devices that use the unlicensed frequency band. Because unlicensed frequency bands may be shared by devices operating according to different communication protocols (such as the 3GPP standards for LTE and 5G NR devices and the IEEE 802.11 standards for Wi-Fi devices), a device operating in an unlicensed frequency band typically contends with other nearby devices for medium access before transmitting data on the unlicensed frequency band.

When communicating in an unlicensed frequency band, a UE or base station may need to coexist or share the unlicensed frequency band with other devices. One way to promote coexistence with other devices is to use a listen-before-talk or listen-before-transmit (LBT) procedure to determine that the shared wireless medium has been idle for a duration before attempting transmissions on the shared wireless medium. In some implementations, LBT procedures may be used with frequency hopping techniques to increase the likelihood of finding a clear channel for communication.

Figure 4:
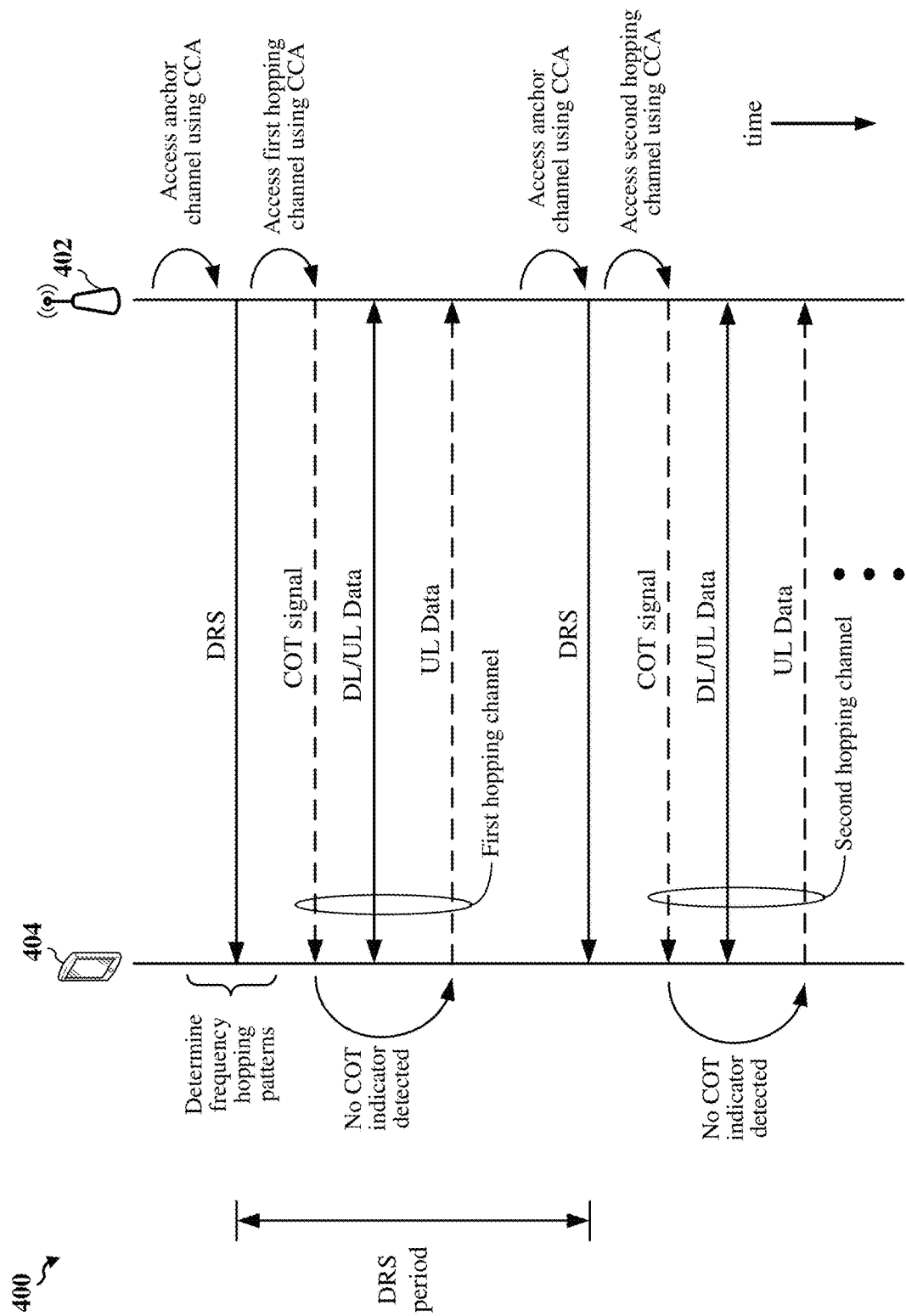
FIG. 4 shows a sequence diagram for wireless communication that supports frequency hopping between a base station and a UE.

FIG. 4 shows a sequence diagram depicting communications 400 between a base station 402 and a UE 404 in a radio access network (RAN). The base station 402 may be one example of the base station 102 of FIG. 1 or the base station 310 of FIG. 3, the UE 404 may be one example of the UE 104 of FIG. 1 or the UE 350 of FIG. 3, and the radio access network may be any suitable RAN including, for example, a 5G NR access network. In some implementations, the communications 400 may be narrowband communications in an unlicensed frequency band. Although described herein with reference to unlicensed portions of the 2.4 GHz frequency band, the communications 400 may be performed on one or more other unlicensed frequency bands (such as one or more of the UNII bands in the 5 GHz frequency band, unlicensed portions of the 6 GHz frequency band, or other unlicensed frequency bands).

The base station 402 and UE 404 may use frequency hopping to exploit the frequency diversity in the unlicensed frequency band. The base station 402 may transmit DL data to the UE 404 according to a DL frequency hopping pattern that includes a first sequence of hopping channels, and the UE 404 may transmit UL data to the base station 402 according to an UL frequency hopping pattern that includes a second sequence of hopping channels different than the first sequence of hopping channels. In some implementations, each hopping channel of the first sequence of hopping channels may be associated with a corresponding DL hopping frame of a sequence of DL hopping frames, and each hopping channel of the second sequence of hopping channels may be associated with a corresponding UL hopping frame of a sequence of UL hopping frames. The DL hopping frames may be used to transmit DL data on corresponding hopping channels of the DL frequency hopping pattern, and the UL hopping frames may be used to transmit UL data on corresponding hopping channels of the UL frequency hopping pattern. In some implementations, the DL hopping channels may be separated from corresponding UL hopping channels by a frequency gap configured or selected to reduce interference between DL and UL transmissions associated with the communications 400.

The base station 402 may transmit a discovery reference signal (DRS) to the UE 404 on an anchor channel of the RAN. The DRS may indicate at least one of the DL frequency hopping pattern or the UL frequency hopping pattern. In some implementations, the DRS may indicate locations of the DL hopping channels and the UL hopping channels, an order in which the UE 404 is to hop between the DL and UL hopping channels, the dwell time on each hopping channel, a duration of the DL and UL hopping frames, the gap frequency, or any combination thereof. In some other implementations, the DRS may indicate locations of the DL hopping channels, and the UE 404 may determine or derive the corresponding UL hopping channels, for example, by applying a constant offset in modulo to the DL hopping channels.

The DRS also may carry system information that includes one or more of a primary synchronization signal (PSS), a secondary synchronization signal (SSS), a physical broadcast channel (PBCH), a system information block (SIB), or a slot format indicator (SFI). In some implementations, the DRS may include a remaining minimum system information (RMSI) field containing information indicative of at least one of the DL frequency hopping pattern or the UL frequency hopping pattern.

The UE 404 may receive the DRS and use information contained therein to determine the locations of the DL hopping channels and the locations of the UL hopping channels. After transmission of the DRS, the base station 402 and the UE 404 may jump to the first DL hopping channel of the DL frequency hopping pattern. The base station 402 may transmit DL data, reference signals, configured grants, and other information on the first DL hopping channel, and the UE 404 may monitor the first DL hopping channel for the DL data, the reference signals, the configured grants, and the other information.

In some implementations, the base station 402 may contend for medium access to the first DL hopping channel using a CCA-based channel access procedure, and may obtain access to the first DL hopping channel for a channel occupancy time (COT) based on winning the contention operation. The base station 402 may transmit a signal informing the UE 404 of the obtained COT on the first DL hopping channel. The signal may be one or more of system information channel occupancy time (SI-COT), a group-common physical downlink control channel (GC-PDCCH), or a common transmit preamble, and the UE 404 may be configured to monitor the first DL hopping channel for the signal.

If the UE 404 detects the signal (which may indicate that the base station 402 has queued DL data to transmit), the base station 402 and the UE 404 may begin exchanging data with each other on the first DL hopping channel and the first UL hopping channel during the DRS period. In some implementations, the UE 404 may be configured for full-duplex operation, and may receive DL data on the first DL hopping channel concurrently with transmitting UL data on the first UL hopping channel. In some other implementations, the UE 404 may be configured for half-duplex operation, and may receive DL data on the first DL hopping channel during one or more first time slots of the COT and transmit UL data on the first UL hopping channel during one or more second time slots of the COT (such as by time-multiplexing the DL and UL transmissions). If the UE 404 does not detect the signal within a time period after transmission of the DRS, the UE 404 may jump to the next DL hopping channel or may transmit UL data to the base station 402 using configured grant (CG) resources.

The base station 402 and the UE 404 may return to the anchor channel at the end of the first DRS period. The base station 402 may transmit a second DRS on the anchor channel to indicate the beginning of a second DRS period. After transmission of the second DRS, the base station 402 and the UE 404 may jump to the second DL hopping channel of the DL frequency hopping pattern. The base station 402 may transmit DL data, reference signals, configured grants, and other information on the second DL hopping channel during the second DRS period, and the UE 404 may monitor the second DL hopping channel for the DL data, the reference signals, the configured grants, and the other information. In some implementations, the UE 404 may receive DL data on the second DL hopping channel concurrently with transmitting UL data on the second UL hopping channel. In some other implementations, the UE 404 may receive DL data on the second DL hopping channel during one or more first time slots within the second DRS period, and may transmit UL data on the second UL hopping channel during one or more second time slots within the second DRS period.

The base station 402 and the UE 404 may perform the above-described operations for each hopping channel of the DL and UL frequency hopping patterns, after which the DL and UL frequency hopping patterns may be sequenced again by the base station 402 and the UE 404 to perform additional narrowband communications in the unlicensed frequency band.

Figure 5:
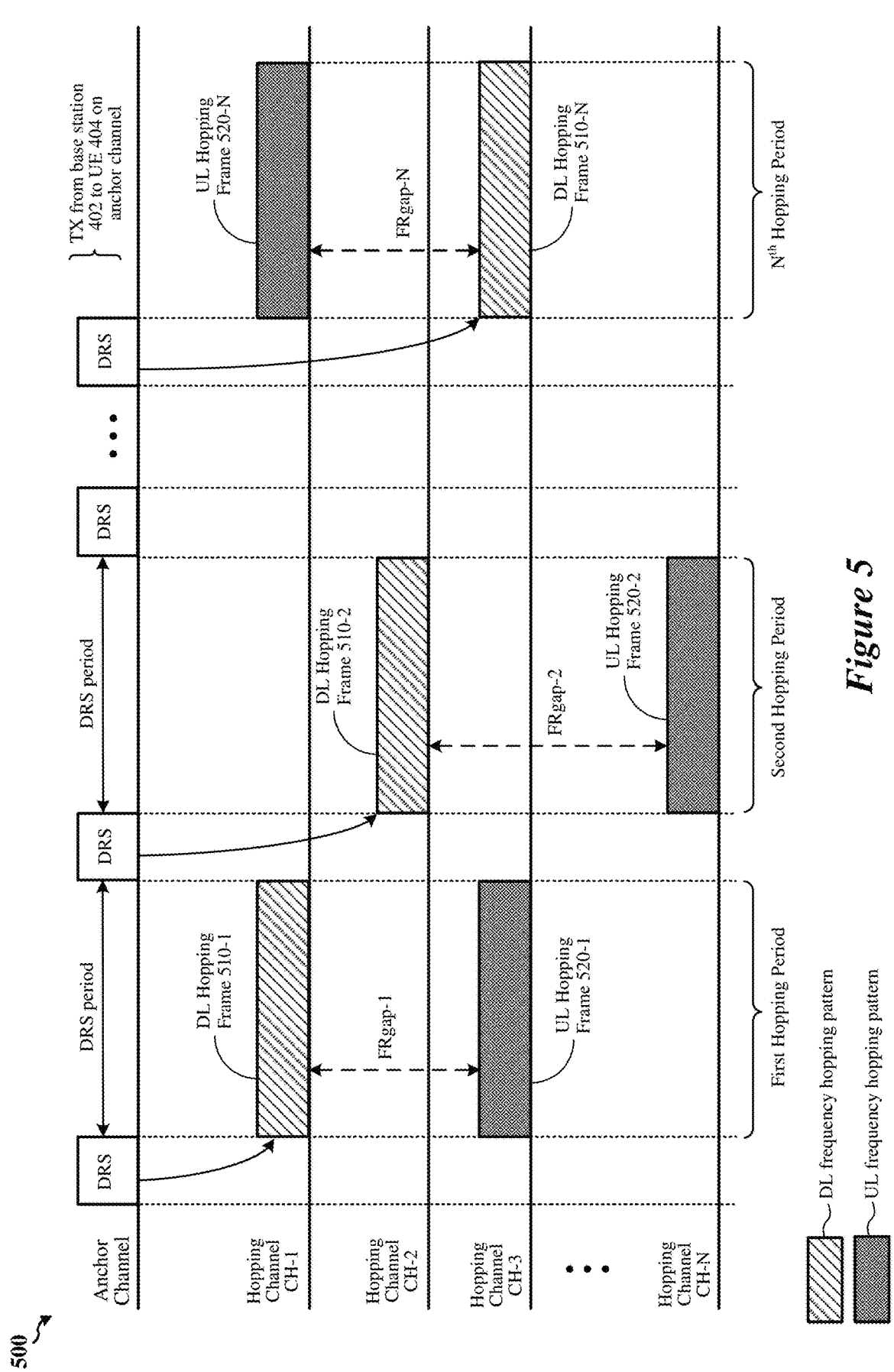
FIG. 5 shows an example frequency hopping pattern that may be used for narrowband communications between a base station and a UE.

FIG. 5 shows an example frequency hopping pattern 500 that may be used for narrowband communications between the base station 402 and the UE 404. In some implementations, the frequency hopping pattern 500 may be a cell-specific frequency hopping pattern, and may be based at least in part on a cell ID and a slot index. The frequency hopping pattern 500 includes a DL frequency hopping pattern 510 and an UL frequency hopping pattern 520. The DL frequency hopping pattern 510 and the UL frequency hopping pattern 520 each may include any suitable number (N) of unique hopping channels (also referred to as hopping frequencies or frequency sub-bands). In some implementations, the DL frequency hopping pattern 510 and the UL frequency hopping pattern 520 each may include N=15 different hopping channels. In some other implementations, the DL frequency hopping pattern 510 and the UL frequency hopping pattern 520 each may include more than 15 different hopping channels. In aspects for which the base station 402 and the UE 404 exchange data using narrowband communications in the 2.4 GHz frequency spectrum, the anchor channel may have a bandwidth of less than 5 MHz, and each of the DL hopping channels and UL hopping channels may have a bandwidth not greater than 5 MHz.

The DL frequency hopping pattern 510 includes a first sequence of hopping channels upon which a sequence of DL hopping frames 510-1 to 510-N may be used to transmit DL data to the UE 404, and the UL frequency hopping pattern 520 includes a second sequence of hopping channels upon which a sequence of UL hopping frames 520-1 to 520-N may be used to transmit UL data to the base station 402. Each of the hopping channels of the DL frequency hopping pattern 510 is separated from a corresponding hopping channel of the UL frequency hopping pattern 520 by a gap frequency that is configured or selected to minimize interference between DL and UL transmissions. For example, the first DL hopping frame 510-1 is separated from the first UL hopping frame 520-1 by a first frequency gap FRgap-1, the second DL hopping frame 510-2 is separated from the second UL hopping frame 520-2 by a second frequency gap FRgap-2, and the $N^{th}$ DL hopping frame 510-N is separated from the $N^{th}$ UL hopping frame 520-N by an $N^{th}$ frequency gap FRgap-N.

In some implementations, the DL frequency hopping pattern 510 may be a cell-specific frequency hopping pattern generated using any suitable technique (such as based on pseudo-random numbers), and the UL frequency hopping pattern 520 may be generated by applying a constant offset in modulo to the DL frequency hopping pattern 510. More specifically, after determining the locations of the DL hopping channels, the UE 404 may apply a constant offset in modulo to each of the DL hopping channels to derive the corresponding UL hopping channels. For example, if c_DL (n) represents the DL hopping channel of the DL frequency hopping pattern 510 at an instance in time n, the UL hopping channel may be determined for that instance in time, n, based on the expression c_UL (n)=(c_DL (n)+Δ) mod N.

The base station 402 and the UE 404 initially tune to the anchor channel, and the base station 402 transmits the DRS on the anchor channel to indicate a beginning of the first DRS period. In some implementations, the DRS may indicate the DL frequency hopping pattern 510 and the UL frequency hopping pattern 520. In some other implementations, the DRS may indicate the DL frequency hopping pattern 510, and the UE 404 may derive the UL frequency hopping pattern 520 based on the DL frequency hopping pattern 510 (such as by applying a constant offset in modulo to the DL frequency hopping pattern 510). The DRS also may include one or more of a primary synchronization signal (PSS), a secondary synchronization signal (SSS), a physical broadcast channel (PBCH), a system information block (SIB), or a slot format indicator (SFI). In some implementations, the DRS also may include remaining minimum system information (RMSI) indicating the DL frequency hopping pattern 510.

The UE 404 may receive the DRS, identify the first DL hopping channel, and jump to the first DL hopping channel to monitor for at least one of an indication of DL data, one or more reference signals, or a grant of UL resources. In some implementations, the base station 402 may contend for medium access to the first DL hopping channel using a CCA-based channel access procedure. Upon gaining access to the first DL hopping channel for a channel occupancy time (COT), the base station 402 may transmit a signal informing the UE 404 (and other nearby wireless communication devices) that it has gained medium access to the first DL hopping channel for a duration indicated by the COT, and may transmit DL data on the first DL hopping channel using a first DL hopping frame 510-1. The signal may be one or more of a system information channel occupancy time (SI-COT), a group-common physical downlink control channel (GC-PDCCH), or a common transmit preamble.

If the UE 404 detects the signal (which may indicate that the base station 402 has queued DL data to transmit), the UE 404 may receive the DL data on the first DL hopping channel via the first DL hopping frame 510-1 concurrently with transmitting UL data on a first UL hopping channel using a first UL hopping frame 520-1. In some implementations, the UE 404 may contend for medium access to the first UL hopping channel using a CCA-based channel access procedure, and may switch to another hopping channel of the UL frequency hopping pattern 520 after a number of unsuccessful CCA-based channel access procedures on the first UL hopping channel.

In some implementations, the UE 404 may transmit at least a portion of the UL data using configured grant (CG) resources if the signal is not detected within a time period (which may indicate that the base station 402 did not obtain a COT on the first DL hopping channel). In some other implementations, the UE 404 may jump to another UL hopping channel of the UL frequency hopping pattern 520 if the signal is not detected within the time period.

For the example of FIG. 5, the base station 402 transmits DL data on hopping channel CH-1 using the first DL hopping frame 510-1 concurrently with the UE 404 transmitting UL data on hopping channel CH-3 using the first UL hopping frame 520-1. In this manner, the base station 402 may operate as a full-duplex device that can transmit DL data on one hopping channel while receiving UL data on another hopping channel, and the UE 404 may operate as a full-duplex device that can receive DL data on the one hopping channel while transmitting UL data on the other hopping channel.

At the end of the first DRS period, the base station 402 and the UE 404 return to the anchor channel, and the base station 402 transmits a second DRS on the anchor channel to indicate a beginning of the second DRS period. The UE 404 may receive the second DRS, switch or jump to the second DL hopping channel, and monitor the second DL hopping channel for a signal indicating that the base station 402 obtained a COT on the second DL hopping channel. The UE 404 also may monitor the second DL hopping channel for one or more reference signals, a grant of UL resources, or other information.

For the example of FIG. 5, the base station 402 transmits DL data on hopping channel CH-2 using the second DL hopping frame 510-2 concurrently with the UE 404 transmitting UL data on hopping channel CH-N using the second UL hopping frame 520-2. The base station 402 and UE 404 may continue communicating data with each other in this manner until the base station 402 and the UE 404 have sequenced through the N respective hopping channels of the DL frequency hopping pattern 510 and the UL frequency hopping pattern 520 (such as when the UE 404 receives DL data on hopping channel CH-3 via DL hopping frame 510-N while concurrently transmitting UL data on hopping channel CH-1 via UL hopping frame 520-N). The base station 402 and the UE 404 may continue narrowband communications in the unlicensed frequency band by sequencing through the hopping channels of the DL and UL frequency hopping patterns one or more additional times.

In some instances, the UE 404 may be susceptible to self-interference resulting from receiving DL data while concurrently transmitting UL data based on the frequency hopping pattern 500 of FIG. 5, and may not have sufficient interference cancellation capabilities to compensate for the self-interference. In some other instances, UL throughput may be more important than DL throughput in a wireless network (or at least for some UEs that operate in the wireless network). For example, when the UE 404 is an IoT sensor (such as a security camera) that persistently transmits sensor data to the base station 402 and infrequently receives DL data, UL throughput may be much more important than DL throughput. As such, in some implementations, the UE 404 may be configured to operate as a half-duplex device, and may communicate with the base station 402 using other frequency hopping patterns in a manner that reduces (if not eliminates) the aforementioned UE self-interference.

Figure 6:
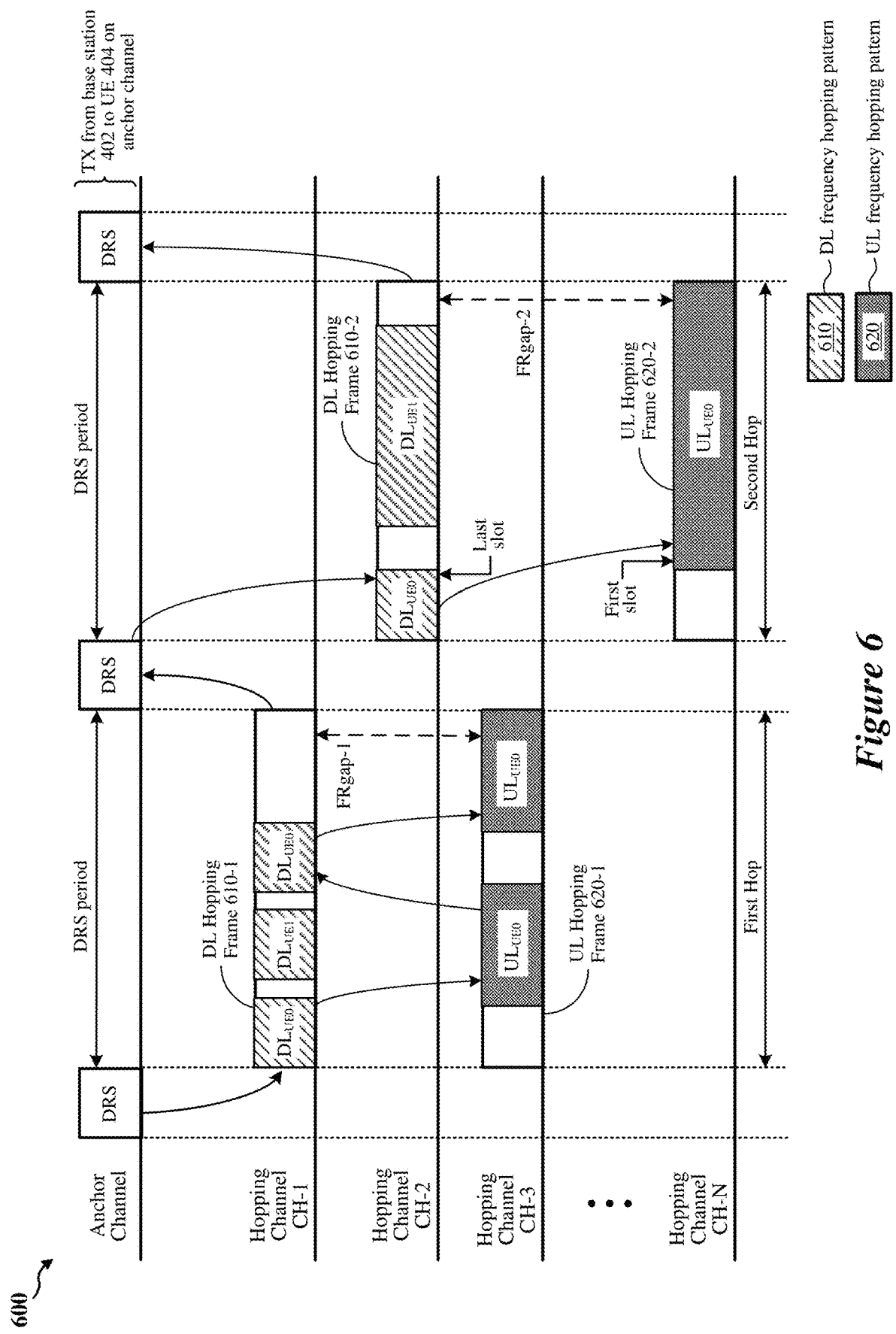
FIG. 6 shows another example frequency hopping pattern that may be used for narrowband communications between a base station and a UE.

FIG. 6 shows another example frequency hopping pattern 600 that may be used for narrowband communications between the base station 402 and the UE 404. The frequency hopping pattern 600 includes a DL frequency hopping pattern 610 and an UL frequency hopping pattern 620. The DL frequency hopping pattern 610 and the UL frequency hopping pattern 620 each may include any suitable number (N) of unique hopping channels. In some implementations, the DL frequency hopping pattern 610 and the UL frequency hopping pattern 620 each may include N=15 different hopping channels. In some other implementations, the DL frequency hopping pattern 610 and the UL frequency hopping pattern 620 each may include more than 15 different hopping channels. In aspects for which the base station 402 and the UE 404 exchange data using narrowband communications in the 2.4 GHz frequency spectrum, the anchor channel may have a bandwidth of less than 5 MHz, and each of the DL hopping channels and UL hopping channels may have a bandwidth not greater than 5 MHz.

The DL frequency hopping pattern 610 includes a first sequence of hopping channels upon which a sequence of DL hopping frames 610-1 to 610-N (only two DL hopping frames 610-1 and 610-2 shown for simplicity) may be used to transmit DL data to one or more UEs, and the UL frequency hopping pattern 620 includes a second sequence of hopping channels upon which a sequence of UL hopping frames 620-1 to 620-N (only two UL hopping frames 620-1 and 620-2 shown for simplicity) may be used to transmit UL data to the base station 402. Each of the hopping channels of the DL frequency hopping pattern 610 is separated from a corresponding hopping channel of the UL frequency hopping pattern 620 by at least a gap frequency that is configured or selected to minimize interference between DL and UL hopping frequencies. For example, the first DL hopping frame 610-1 is separated from the first UL hopping frame 620-1 by a first frequency gap FRgap-1, and the second DL hopping frame 610-2 is separated from the second UL hopping frame 620-2 by a second frequency gap FRgap-2. In some implementations, the DL hopping frames of the DL frequency hopping pattern 610 may be separated from corresponding UL hopping frames of the UL frequency hopping pattern 620 by a constant frequency offset in modulo.

The base station 402 and the UE 404 initially tune to the anchor channel, and the base station 402 transmits the DRS on the anchor channel to indicate a beginning of the first DRS period. In some implementations, the DRS may indicate the DL frequency hopping pattern 610 and the UL frequency hopping pattern 620. In some other implementations, the DRS may indicate the DL frequency hopping pattern 610, and the UE 404 may derive the UL frequency hopping pattern 620 based on the DL frequency hopping pattern 610 (such as by applying a constant offset in modulo to the DL frequency hopping pattern 610). The DRS also may include one or more of a primary synchronization signal (PSS), a secondary synchronization signal (SSS), a physical broadcast channel (PBCH), a system information block (SIB), or a slot format indicator (SFI). In some implementations, the DRS also may include remaining minimum system information (RMSI) indicating the DL frequency hopping pattern 610.

The UE 404 may receive the DRS, identify the first DL hopping channel, and jump to the first DL hopping channel to monitor for at least one of an indication of DL data, one or more reference signals, or a grant of UL resources. Upon gaining access to the first DL hopping channel for a first COT, the base station 402 may transmit a signal informing the UE 404 (and other nearby wireless communication devices) that it has gained medium access to the first DL hopping channel for a duration indicated by the first COT. The base station 402 may transmit DL data to one or more UEs on the first DL hopping channel during the first COT.

After detecting the signal, the UE 404 receives the first DL data on the first DL hopping channel during a first portion of the first COT, switches or jumps to the first UL hopping channel, and transmits UL data on the first UL hopping channel during a second portion of the first COT. Upon completion of the UL data transmission, the UE 404 may return to the first DL hopping channel to monitor for DL data, reference signals, and UL grants. The UE 404 may continue jumping between the first DL hopping channel and the first UL hopping channel, for example, to alternately receive DL data and transmit UL data during the first COT.

For the example of FIG. 6, the base station 402 transmits first DL data on hopping channel CH-1 to UE0 using first slots of the first DL hopping frame 610-1, transmits second DL data on hopping channel CH-1 to UE1 using second slots of the first DL hopping frame 610-1, and transmits third DL data on hopping channel CH-1 to UE0 using third slots of the first DL hopping frame 610-1. For purposes of discussion herein, the UE 404 may be UE0.

The UE 404, operating as UE0, receives the first DL data contained in the first slots of the first DL hopping frame 610-1, jumps to the first UL hopping channel, and transmits UL data using first slots of the first UL hopping frame 620-1 on hopping channel CH-3. The UE 404 returns to the first DL hopping channel and receives the third DL data contained in the third slots of the first DL hopping frame 610-1, jumps to the first UL hopping channel, and transmits additional UL data using second slots of the first UL hopping frame 620-1 on hopping channel CH-3.

At the end of the first DRS period, the base station 402 and the UE 404 return to the anchor channel, and the base station 402 transmits a second DRS on the anchor channel to indicate a beginning of the second DRS period. The UE 404 may receive the second DRS, switch or jump to the second DL hopping channel, and monitor the second DL hopping channel for a signal indicating that the base station 402 obtained a COT on the second DL hopping channel. The UE 404 also may monitor the second DL hopping channel for one or more reference signals, a grant of UL resources, or other information.

During the second DRS period in the example of FIG. 6, the base station 402 transmits first DL data on hopping channel CH-2 to UE0 using first slots of the second DL hopping frame 610-2, and transmits second DL data on hopping channel CH-2 to UE1 using second slots of the second DL hopping frame 610-2. The UE 404, operating as UE0, receives the first DL data contained in the first slots of the second DL hopping frame 610-2, jumps to the second UL hopping channel, and transmits UL data using the remaining available slots of the second UL hopping frame 620-2 on hopping channel CH-N. At the end of the second DRS period, the base station 402 and the UE 404 return to the anchor channel.

The UE 404 (and other UEs participating in the communications of FIG. 6) may need a time period of approximately one symbol duration to re-tune its transceivers when jumping between DL and UL hopping channels. In some implementations, standard K1 and K2 values may be used to accommodate the returning gap, for example, where the K1 value may indicate the number of slots between the end of the PDSCH and a beginning of the PUSCH, and the K2 value may indicate the number of slots between the end of the PUSCH and a beginning of the PDSCH. In instances for which a reception slot in a DL hopping frame occurs less than a symbol duration before a transmission slot in an UL hopping frame, the last symbol of the received DL data may be reserved as the re-tuning gap. For example, the last slot in the second DL hopping frame 610-2 that contains DL data for UE0 occurs at approximately the same time as the first slot available in the second UL hopping frame 620-2, and therefore the last symbol of the DL data carried in the DL hopping frame 610-2 may be reserved as the re-tuning gap for UE0.

Figure 7:
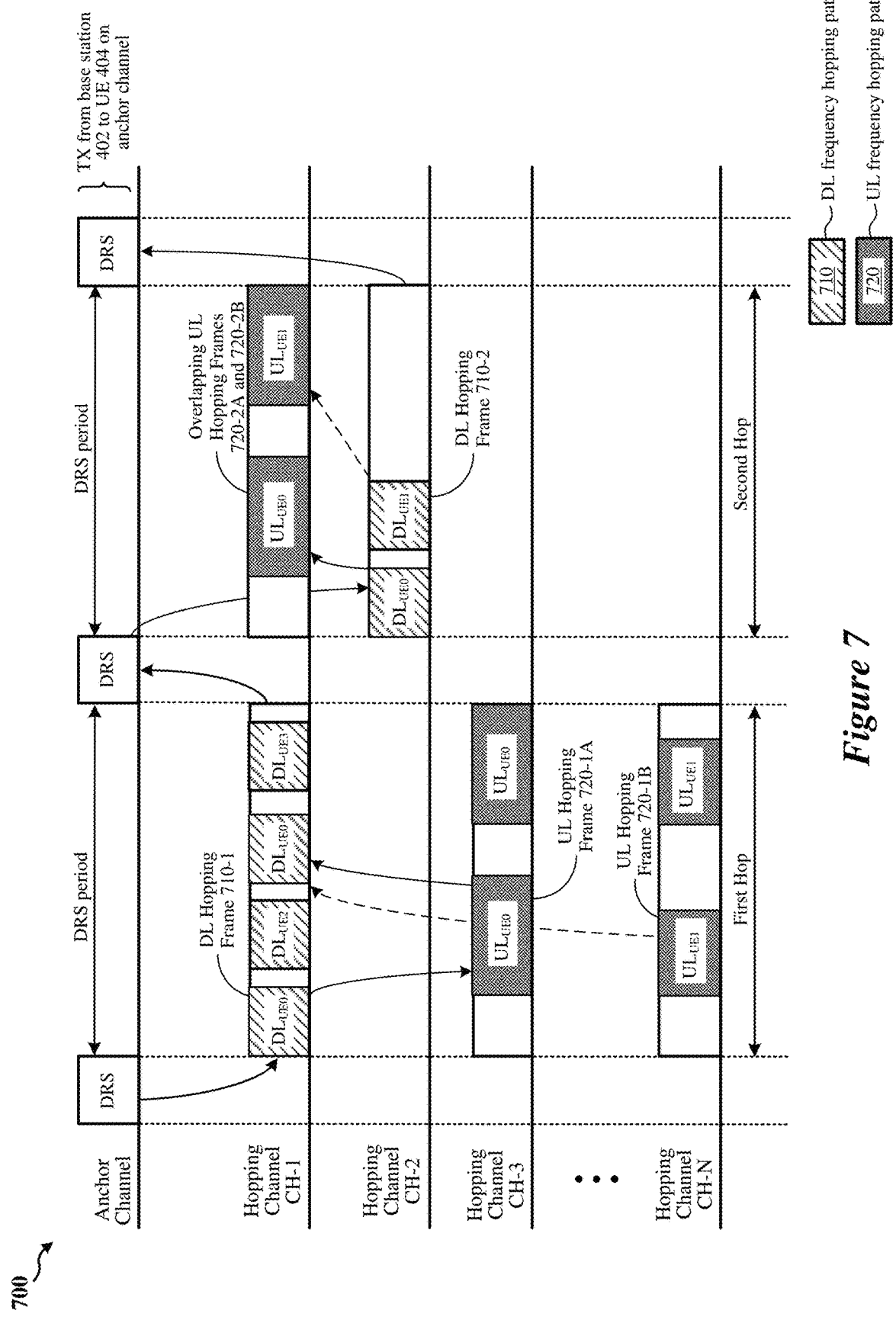
FIG. 7 shows another example frequency hopping pattern that may be used for narrowband communications between a base station and a UE.

FIG. 7 shows another example frequency hopping pattern 700 that may be used for narrowband communications between the base station 402 and the UE 404. The frequency hopping pattern 700 includes a DL frequency hopping pattern 710 and an UL frequency hopping pattern 720. The DL frequency hopping pattern 710 and the UL frequency hopping pattern 720 each may include any suitable number (N) of unique hopping channels. In some implementations, the DL frequency hopping pattern 710 and the UL frequency hopping pattern 720 each may include N=15 different hopping channels. In some other implementations, the DL frequency hopping pattern 710 and the UL frequency hopping pattern 720 each may include more than 15 different hopping channels. In aspects for which the base station 402 and the UE 404 exchange data using narrowband communications in the 2.4 GHz frequency spectrum, the anchor channel may have a bandwidth of less than 5 MHz, and each of the DL hopping channels and UL hopping channels may have a bandwidth not greater than 5 MHz.

The DL frequency hopping pattern 710 includes a sequence of DL hopping channels upon which a sequence of DL hopping frames 710-1 to 710-N (only two DL hopping frames 710-1 and 710-2 shown for simplicity) may be used to transmit DL data to one or more UEs. The UL frequency hopping pattern 720 includes a first sequence of UL hopping channels upon which a first sequence of UL hopping frames 720-1A to 720-NA (only two UL hopping frames 720-1A and 720-2A shown for simplicity) may be used by a first UE (such as UE0) to transmit UL data to the base station 402, and includes a second sequence of UL hopping channels upon which a second sequence of UL hopping frames 720-1B to 720-NB (only two UL hopping frames 720-1B and 720-2B shown for simplicity) may be used by a second UE (such as UE1) to transmit UL data to the base station 402. In this manner, UE0 and UE1 each may be allocated its own UL hopping frames to transmit UL data on unique hopping channels within the UL frequency hopping pattern 720.

Each of the hopping channels of the DL frequency hopping pattern 710 is separated from corresponding hopping channels of the UL frequency hopping pattern 720 by at least a gap frequency that is configured or selected to minimize interference between DL and UL hopping frequencies. In some implementations, the DL hopping frames of the DL frequency hopping pattern 710 may be separated from the UL hopping frames of the UL frequency hopping pattern 720 by a constant frequency offset in modulo.

The base station 402 and the UEs initially tune to the anchor channel, and the base station 402 transmits the DRS on the anchor channel to indicate a beginning of the first DRS period. In some implementations, the DRS may indicate the DL frequency hopping pattern 710, and each of the UEs may derive a corresponding UL frequency hopping pattern based on the DL frequency hopping pattern 710 and an identifier unique to the UE. For example, UE0 may use its UEID to derive a first UL frequency hopping pattern from the DL frequency hopping pattern 710, UE1 may use its UEID to derive a second UL frequency hopping pattern from the DL frequency hopping pattern 710, and so on, where each of the derived UL frequency hopping patterns includes a sequence of UL hopping channels upon which a sequence of UL hopping frames may be used to transmit UL data.

For the example of FIG. 7, the base station 402 transmits first DL data on hopping channel CH-1 to UE0 using first slots of the first DL hopping frame 710-1, transmits second DL data on hopping channel CH-1 to UE2 using second slots of the first DL hopping frame 710-1, transmits third DL data on hopping channel CH-1 to UE0 using third slots of the first DL hopping frame 710-1, and transmits fourth DL data on hopping channel CH-1 to UE3 using fourth slots of the first DL hopping frame 710-1.

The UE 404, operating as UE0, receives the first DL data contained in the first slots of the first DL hopping frame 710-1, jumps to the first UL hopping channel, and transmits UL data using first slots of its first UL hopping frame 720-1A on hopping channel CH-3. The UE 404 returns to the first DL hopping channel and receives the third DL data contained in the third slots of the first DL hopping frame 710-1. The UE 404 returns to its first UL hopping channel and transmits additional UL data using second slots of its first UL hopping frame 720-1A on hopping channel CH-3, and returns to the anchor channel at the end of the DRS period.

UE1 detects an absence of DL data on the first DL hopping channel, and jumps to its first UL hopping channel. For example, UE1 transmits UL data using first slots of its first UL hopping frame 720-1B on hopping channel CH-N, and returns to the first DL hopping channel. UE1 again detects an absence of DL data on the first DL hopping channel, and jumps to its first UL hopping channel. UE1 transmits additional UL data using second slots of its first UL hopping frame 720-1B on hopping channel CH-N, and returns to the anchor channel at the end of the DRS period.

UE2 receives the second DL data contained in the second slots of the first DL hopping frame 710-1, and determines whether it has buffered UL data. For the example of FIG. 7, UE2 does not have any buffered UL data, and stays on the first DL hopping channel to monitor for additional DL data, one or more reference signals, a grant of UL resources, or other suitable information. UE2 returns to the anchor channel at the end of the DRS period.

For the example of FIG. 7, the UL frequency hopping patterns used by UE0 and UE1 are not coordinated, and may avoid certain FCC restrictions on communications that employ coordinated frequency hopping patterns. The lack of coordination between the UL frequency hopping patterns used by UE0 and UE1 may result in their respective UL hopping frames overlapping in frequency in one or more DRS periods. For example, FIG. 7 depicts the UL hopping frames 720-2A and 720-2B used by UE0 and UE1, respectively, in the second DRS period as occupying the same hopping frequency, hopping channel CH-1. The overlapping UL hopping frames 720-2A and 720-2B may result in collisions between UL data transmissions from UE0 and UE1. In some implementations, the UL data from UE0 may be time-multiplexed or frequency-multiplexed with the UL data from UE1 and transmitted on one of the UL hopping frame 720-2A or the UL hopping frame 720-2B.

Figure 8:
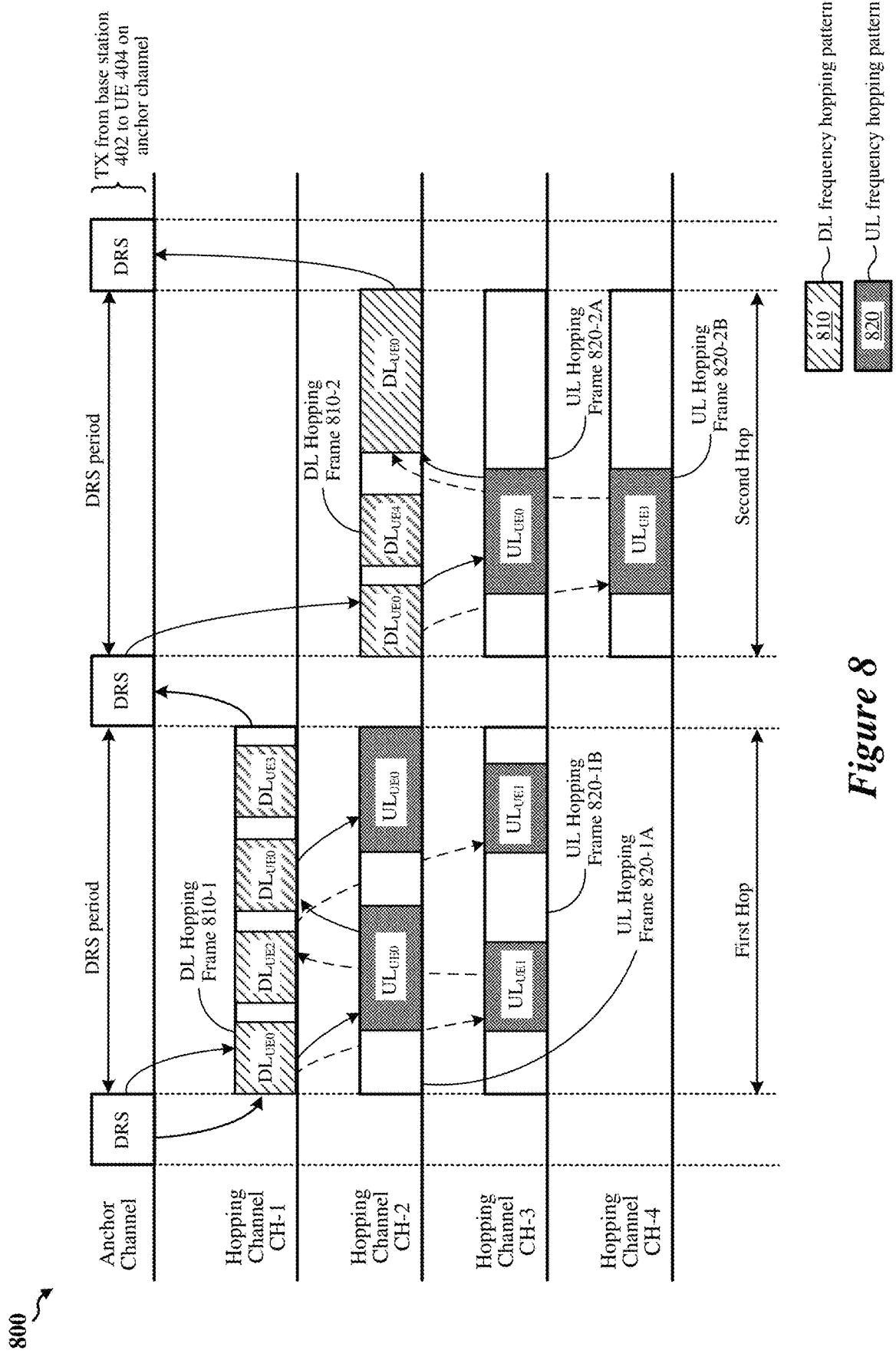
FIG. 8 shows another example frequency hopping pattern that may be used for narrowband communications between a base station and a UE.

FIG. 8 shows another example frequency hopping pattern 800 that may be used for narrowband communications between the base station 402 and the UE 404. The frequency hopping pattern 800 includes a DL frequency hopping pattern 810 and an UL frequency hopping pattern 820. The DL frequency hopping pattern 810 and the UL frequency hopping pattern 820 each may include any suitable number (N) of unique hopping channels. In some implementations, the DL frequency hopping pattern 810 and the UL frequency hopping pattern 820 each may include N=15 different hopping channels. In some other implementations, the DL frequency hopping pattern 810 and the UL frequency hopping pattern 820 each may include more than 15 different hopping channels. In aspects for which the base station 402 and the UE 404 exchange data using narrowband communications in the 2.4 GHz frequency spectrum, the anchor channel may have a bandwidth of less than 5 MHz, and each of the DL hopping channels and UL hopping channels may have a bandwidth not greater than 5 MHz.

The DL frequency hopping pattern 810 includes a sequence of DL hopping channels upon which a sequence of DL hopping frames 810-1 to 810-N (only two DL hopping frames 810-1 and 810-2 shown for simplicity) may be used to transmit DL data to one or more UEs. The UL frequency hopping pattern 820 includes a first sequence of UL hopping channels upon which a first sequence of UL hopping frames 820-1A to 820-NA (only two UL hopping frames 820-1A and 820-2A shown for simplicity) may be used by a first UE (such as UE0) to transmit UL data to the base station 402, and includes a second sequence of UL hopping channels upon which a second sequence of UL hopping frames 820-1B to 820-NB (only two UL hopping frames 820-1B and 820-2B shown for simplicity) may be used by a second UE (such as UE1) to transmit UL data to the base station 402. In this manner, UE0 and UE1 each may be allocated its own UL hopping frames to transmit UL data on unique hopping channels within the UL frequency hopping pattern 820.

In contrast to the uncoordinated UL frequency hopping patterns used by UE0 and UE1 in the example of FIG. 7, the UL frequency hopping patterns used by UE0 and UE1 in the example of FIG. 8 may be coordinated to avoid collisions between UL data transmissions from UE0 and UE1. In some instances, coordination between the UL frequency hopping patterns used by UE0 and UE1 may subject UL transmissions from UE0 and UE1 to additional FCC restrictions. In some implementations, UE0 and UE1 may be configured to use a category-2 LBT procedure to gain medium access to their respective UL hopping channels.

In some implementations, the UL frequency hopping patterns 820 used by UE0 and UE1 may be orthogonal to each other and may be orthogonal to the DL frequency hopping pattern 810, which may avoid certain FCC restrictions on communications that employ frequency hopping techniques. In some implementations, a number N of orthogonal UL frequency hopping patterns may be derived from the DL frequency hopping pattern 810 and UE-specific information (such as the UEID). For example, if c_DL (n) represents the DL hopping channel of the DL frequency hopping pattern 810 at an instance in time n, then each of a plurality of orthogonal UL hopping channels may be determined at that instance in time, n, based on the expression c_UL (n)=(c_DL (n)+i) mod N, where i is the pattern index for which 0≤i<N.

The base station 402 and the UEs initially tune to the anchor channel, and the base station 402 transmits the DRS on the anchor channel to indicate a beginning of the first DRS period. In some implementations, the DRS may indicate the DL frequency hopping pattern 810, and each of the UEs may derive a corresponding orthogonal UL frequency hopping pattern as described above. The DRS also may include one or more of a primary synchronization signal (PSS), a secondary synchronization signal (SSS), a physical broadcast channel (PBCH), a system information block (SIB), or a slot format indicator (SFI). In some implementations, the DRS also may include remaining minimum system information (RMSI) indicating the DL frequency hopping pattern 810.

For the example of FIG. 8, the base station 402 transmits first DL data on hopping channel CH-1 to UE0 using first slots of the first DL hopping frame 810-1, transmits second DL data on hopping channel CH-1 to UE2 using second slots of the first DL hopping frame 810-1, transmits third DL data on hopping channel CH-1 to UE0 using third slots of the first DL hopping frame 810-1, and transmits fourth DL data on hopping channel CH-1 to UE3 using fourth slots of the first DL hopping frame 810-1.

The UE 404, operating as UE0, receives the first DL data contained in the first slots of the first DL hopping frame 810-1, jumps to its first UL hopping channel, and transmits UL data using first slots of its first UL hopping frame 820-1A on hopping channel CH-2. After the UL transmissions, the UE 404 returns to the first DL hopping channel and receives the third DL data contained in the third slots of the first DL hopping frame 810-1. The UE 404 returns to its first UL hopping channel and transmits additional UL data using second slots of its first UL hopping frame 820-1A on hopping channel CH-2, and returns to the anchor channel at the end of the DRS period.

UE1 detects an absence of DL data on the first DL hopping channel, jumps to its first UL hopping channel, and transmits UL data using first slots of its first UL hopping frame 820-1B on hopping channel CH-3, and returns to the first DL hopping channel. After detecting an absence of DL data on the first DL hopping channel, UE1 again jumps to its first UL hopping channel and transmits additional UL data using second slots of its first UL hopping frame 820-1B on hopping channel CH-3. UE1 returns to the anchor channel at the end of the DRS period.

UE2 receives the second DL data contained in the second slots of the first DL hopping frame 810-1, and determines whether it has buffered UL data. For the example of FIG. 8, UE2 does not have any buffered UL data, and stays on the first DL hopping channel to monitor for additional DL data, one or more reference signals, a grant of UL resources, or other suitable information. UE2 returns to the anchor channel at the end of the DRS period.

Figure 9:
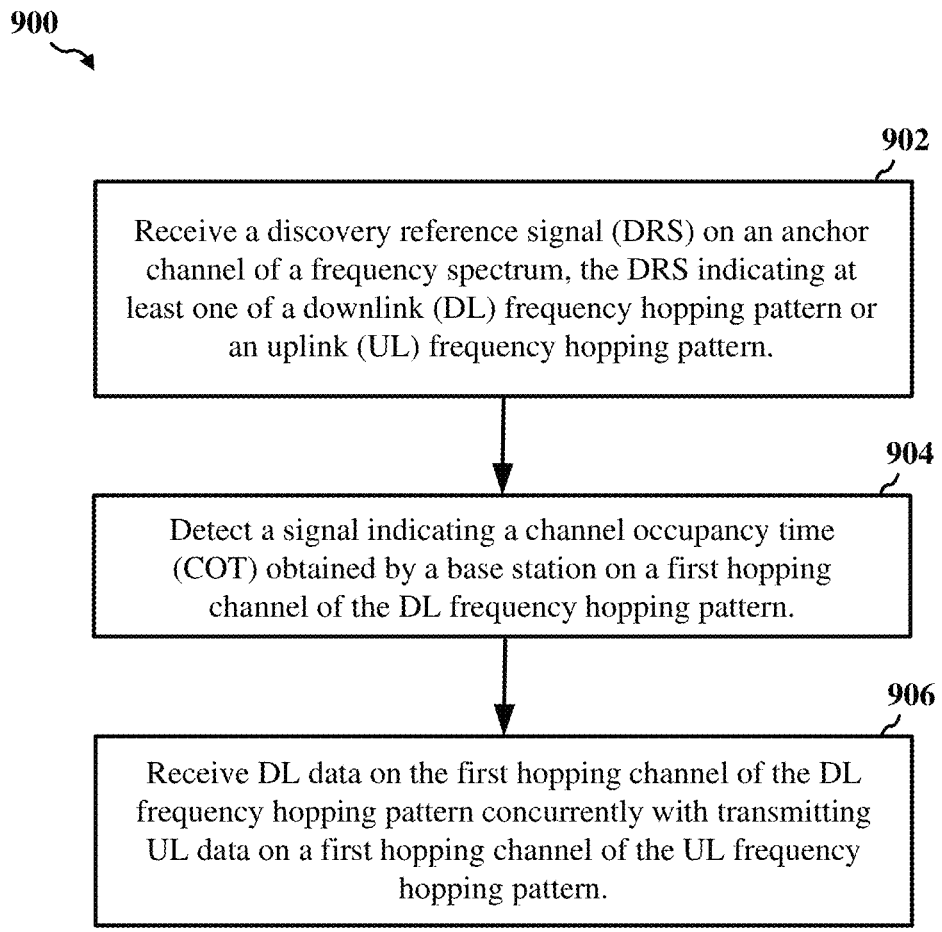
FIG. 9 shows a flowchart depicting an example operation for wireless communication that supports frequency hopping between a base station and a UE.

FIG. 9 shows a flowchart depicting an example operation 900 for wireless communication that supports frequency hopping between a base station and a UE. The operation 900 may be performed by a wireless communication device such as the UE 104 of FIG. 1, the UE 350 of FIG. 3, or the UE 404 of FIG. 4. At block 902, the UE receives a discovery reference signal (DRS) on an anchor channel of a frequency spectrum, the DRS indicating at least one of a downlink (DL) frequency hopping pattern or an uplink (UL) frequency hopping pattern. At block 904, the UE detects a signal indicating a channel occupancy time (COT) obtained by the base station on a first hopping channel of the DL frequency hopping pattern. At block 906, the UE receives DL data on the first hopping channel of the DL frequency hopping pattern concurrently with transmitting UL data on a first hopping channel of the UL frequency hopping pattern.

The DL frequency hopping pattern may include a first sequence of hopping channels, and the UL frequency hopping pattern may include a second sequence of hopping channels different than the first sequence of hopping channels. Each hopping channel of the first sequence of hopping channels may be separated from a corresponding hopping channel of the second sequence of hopping channels by at least a gap frequency configured or selected to reduce interference between the DL and UL transmissions. In some implementations, each of the DL frequency hopping pattern and the UL frequency hopping pattern may be based at least in part on a cell ID and a slot index. In some other implementations, the DL frequency hopping pattern may be a cell-specific frequency hopping pattern, and the UL frequency hopping pattern may be derived by applying a constant offset in modulo to the DL frequency hopping pattern.

In some implementations, the DRS in block 902 also may include one or more of a primary synchronization signal (PSS), a secondary synchronization signal (SSS), a physical broadcast channel (PBCH), a system information block (SIB), a slot format indicator (SFI), or remaining minimum system information (RMSI). The DRS may have a dwell time on the anchor channel based on one or more of the 3GPP standards. In some implementations, each of the DL frequency hopping pattern and the UL frequency hopping pattern includes at least 15 unique hopping channels, and each of the at least 15 unique hopping channels has a dwell time based on one or more of the 3GPP standards.

In some implementations, the signal indicating the COT in block 904 may be one or more of a system information channel occupancy time (SI-COT), a group-common physical downlink control channel (GC-PDCCH), or a common transmit preamble. The COT may be obtained by the base station based on a clear channel assessment (CCA) procedure performed on the first hopping channel of the DL frequency hopping pattern.

In some implementations, the first hopping channel of the DL frequency hopping pattern in block 906 may be associated with a corresponding DL hopping frame of a sequence of DL hopping frames, and the first hopping channel of the UL frequency hopping pattern in block 906 may be associated with a corresponding UL hopping frame of a sequence of UL hopping frames. In some implementations, the frequency spectrum may be an unlicensed frequency band in the 2.4 GHz frequency spectrum, each of the DL hopping channels may have a bandwidth not greater than 5 MHz, and each of the UL hopping channels may have a bandwidth not greater than 5 MHz. In some other implementations, the frequency spectrum may be an unlicensed frequency band in another frequency spectrum (such as the 5 GHz frequency spectrum or the 6 GHz frequency spectrum), and one or both of the DL hopping channels and the UL hopping channels may have other suitable bandwidths.

In some implementations, the DL data in block 906 may be received using one of a physical downlink shared channel (PDSCH) or a physical downlink control channel (PDCCH), and the UL data in block 906 may be transmitted using one of a physical uplink shared channel (PUSCH) or a physical uplink control channel (PUCCH).

Figure 10A:
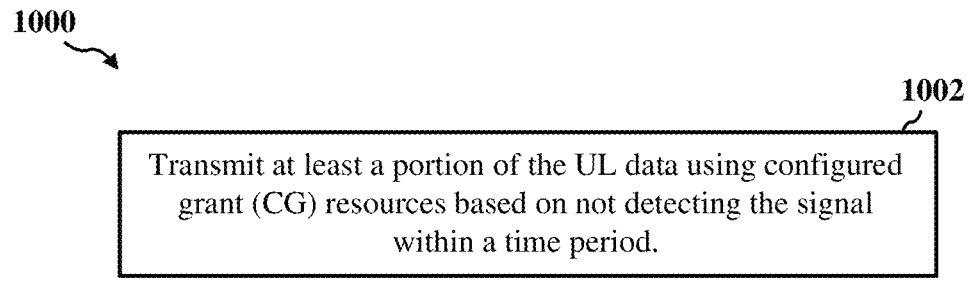
FIGS. 10A and 10B show flowcharts depicting example operations for wireless communication that supports frequency hopping between a base station and a UE.

FIG. 10A shows a flowchart depicting an example operation 1000 for wireless communication that supports frequency hopping between a base station and a UE. The operation 1000 may be performed by a wireless communication device such as the UE 104 of FIG. 1, the UE 350 of FIG. 3, or the UE 404 of FIG. 4. In some implementations, the operation 1000 begins when the UE does not detect the signal indicating the COT in block 904 of FIG. 9. At block 1002, the UE transmits at least a portion of the UL data using configured grant (CG) resources based on not detecting the signal within a time period. The time period may be of any suitable duration, for example, that allows the UE to transmit at least a portion of buffered UL data during a corresponding DRS period.

Figure 10B:
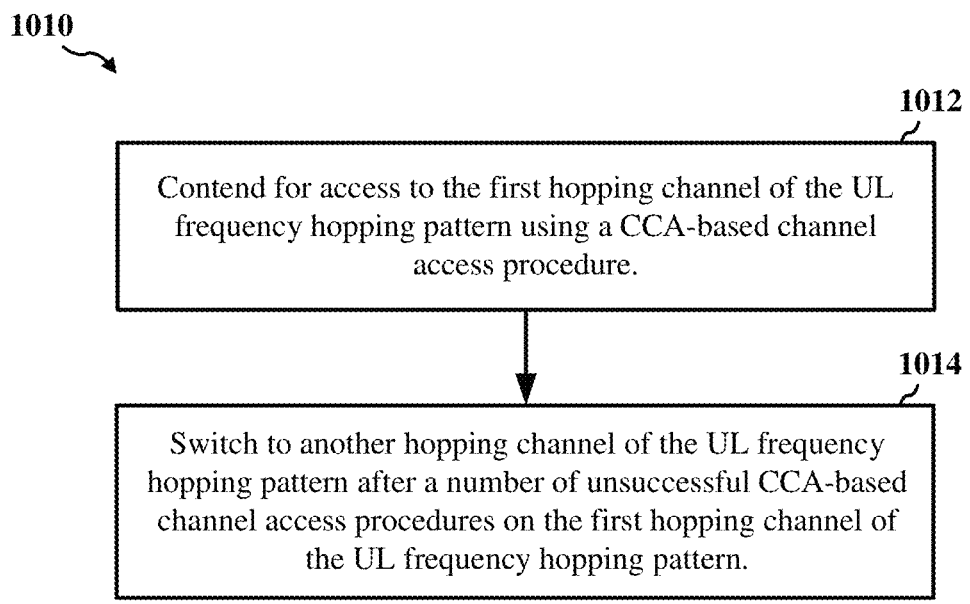

FIG. 10B shows a flowchart depicting an example operation 1010 for wireless communication that supports frequency hopping between a base station and a UE. The operation 1010 may be performed by a wireless communication device such as the UE 104 of FIG. 1, the UE 350 of FIG. 3, or the UE 404 of FIG. 4. In some implementations, the operation 1010 begins after the UE receives DL data concurrently with transmitting UL data in block 906 of FIG. 9. For example, in block 1012, the UE contends for access to the first hopping channel of the UL frequency hopping pattern using a CCA-based channel access procedure. At block 1014, the UE switches to another hopping channel of the UL frequency hopping pattern after a number of unsuccessful CCA-based channel access procedures on the first hopping channel of the UL frequency hopping pattern.

Figure 11:
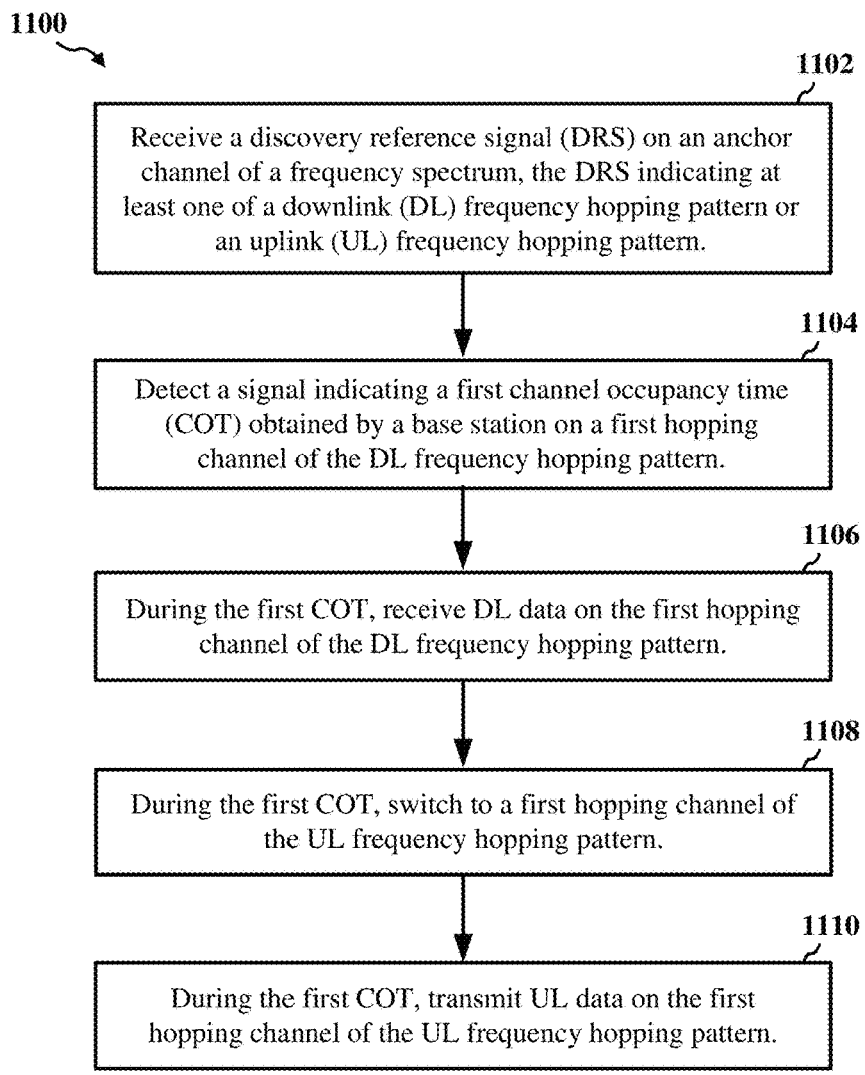
FIG. 11 shows a flowchart depicting an example operation for wireless communication that supports frequency hopping between a base station and a UE.

FIG. 11 shows a flowchart depicting an example operation 1100 for wireless communication that supports frequency hopping between a base station and a UE. The operation 1100 may be performed by a wireless communication device such as the UE 104 of FIG. 1, the UE 350 of FIG. 3, or the UE 404 of FIG. 4. At block 1102, the UE receives a discovery reference signal (DRS) on an anchor channel of a frequency spectrum, the DRS indicating at least one of a downlink (DL) frequency hopping pattern or an uplink (UL) frequency hopping pattern. At block 1104, the UE detects a signal indicating a first channel occupancy time (COT) obtained by the base station on a first hopping channel of the DL frequency hopping pattern. During the first COT, the UE receives DL data on the first hopping channel of the DL frequency hopping pattern at block 1106, switches to a first hopping channel of the UL frequency hopping pattern at block 1108, and transmits UL data on the first hopping channel of the UL frequency hopping pattern at block 1110.

In some implementations, the DL frequency hopping pattern includes a first sequence of hopping channels, and the UL frequency hopping pattern includes a second sequence of hopping channels different than the first sequence of hopping channels. Each hopping channel of the first sequence of hopping channels may be separated from a corresponding hopping channel of the second sequence of hopping channels by at least a gap frequency. In some implementations, each of the DL frequency hopping pattern and the UL frequency hopping pattern may be based at least in part on a cell ID and a slot index. In some other implementations, the DL frequency hopping pattern may be a cell-specific frequency hopping pattern, and the UL frequency hopping pattern may be derived by applying a constant offset in modulo to the DL frequency hopping pattern.

In some implementations, the DRS in block 1102 also may include one or more of a primary synchronization signal (PSS), a secondary synchronization signal (SSS), a physical broadcast channel (PBCH), a system information block (SIB), a slot format indicator (SFI), or remaining minimum system information (RMSI). The DRS may have a dwell time on the anchor channel based on one or more of the 3GPP standards. In some implementations, each of the DL frequency hopping pattern and the UL frequency hopping pattern includes at least 15 unique hopping channels, and each of the at least 15 unique hopping channels has a dwell time based on one or more of the 3GPP standards.

In some implementations, the signal indicating the first COT in block 1104 may be one or more of a system information channel occupancy time (SI-COT), a group-common physical downlink control channel (GC-PDCCH), or a common transmit preamble. The first COT may be obtained based on a CCA channel access procedure performed by the base station on the first hopping channel of the DL frequency hopping pattern.

In some implementations, the first hopping channel of the DL frequency hopping pattern in block 1106 may be associated with a corresponding DL hopping frame of a sequence of DL hopping frames. The DL data in block 1106 may be received using one of a physical downlink shared channel (PDSCH) or a physical downlink control channel (PDCCH).

In some implementations, the first hopping channel of the UL frequency hopping pattern in block 1110 may be associated with a corresponding UL hopping frame of a sequence of UL hopping frames. The UL data in block 1110 may be transmitted using one of a physical uplink shared channel (PUSCH) or a physical uplink control channel (PUCCH).

Figure 12A:
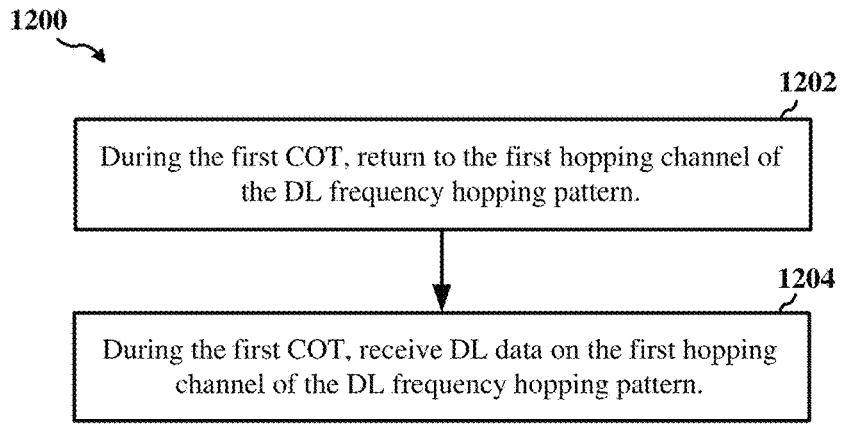
FIGS. 12A, 12B, and 12C show flowcharts depicting example operations for wireless communication that supports frequency hopping between a base station and a UE.

FIG. 12A shows a flowchart depicting an example operation 1200 for wireless communication that supports frequency hopping between a base station and a UE. The operation 1200 may be performed by a wireless communication device such as the UE 104 of FIG. 1, the UE 350 of FIG. 3, or the UE 404 of FIG. 4. In some implementations, the operation 1200 begins after the UE transmits the UL data on the first hopping channel of the UL frequency hopping pattern in block 1110 of FIG. 11. For example, during the first COT, the UE returns to the first hopping channel of the DL frequency hopping pattern at block 1202, and receives DL data on the first hopping channel of the DL frequency hopping pattern at block 1204.

Figure 12B:
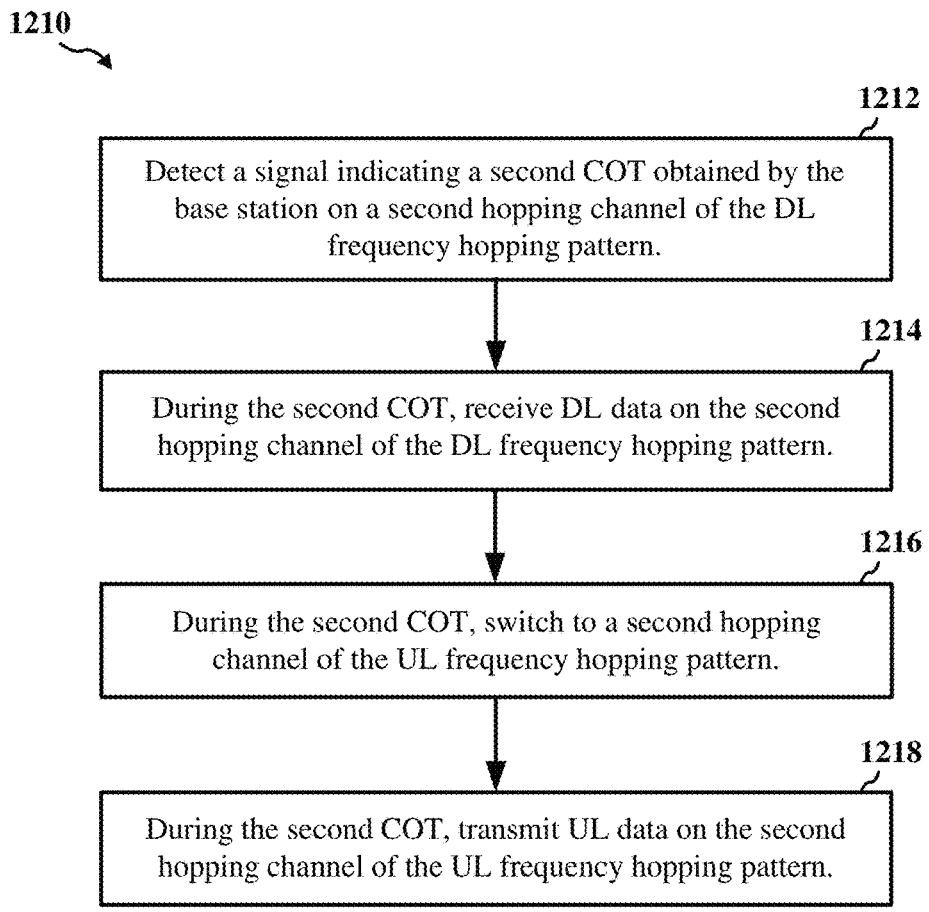

FIG. 12B shows a flowchart depicting an example operation 1210 for wireless communication that supports frequency hopping between a base station and a UE. The operation 1210 may be performed by a wireless communication device such as the UE 104 of FIG. 1, the UE 350 of FIG. 3, or the UE 404 of FIG. 4. In some implementations, the operation 1210 begins after the UE transmits the UL data on the first hopping channel of the UL frequency hopping pattern in block 1110 of FIG. 11. In some other implementations, the operation 1210 begins after the UE receives the DL data on the first hopping channel of the DL frequency hopping pattern in block 1204 of FIG. 12A. For example, at block 1212, the UE may detect a signal indicating a second COT obtained by the base station on a second hopping channel of the DL frequency hopping pattern. During the second COT, the UE receives DL data on the second hopping channel of the DL frequency hopping pattern at block 1214, switches to a second hopping channel of the UL frequency hopping pattern at block 1216, and transmits UL data on the second hopping channel of the UL frequency hopping pattern at block 1218.

Figure 12C:
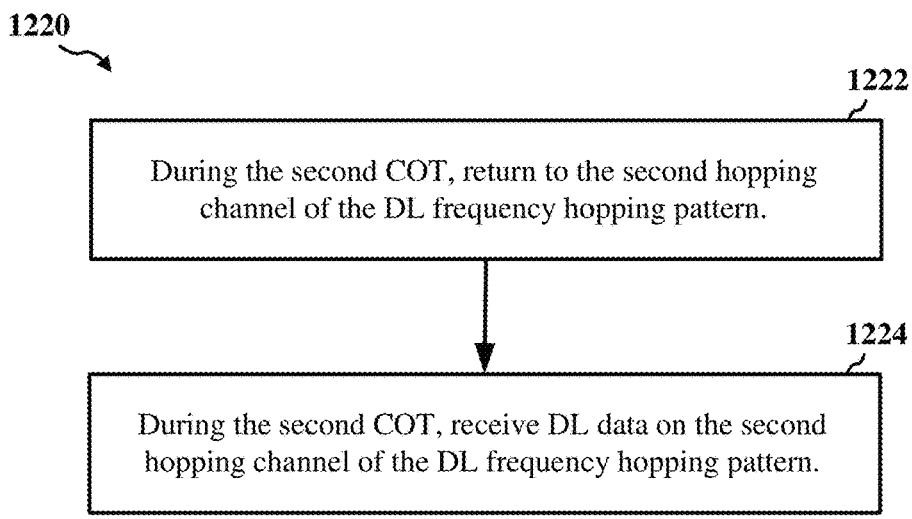

FIG. 12C shows a flowchart depicting an example operation 1220 for wireless communication that supports frequency hopping between a base station and a UE. The operation 1220 may be performed by a wireless communication device such as the UE 104 of FIG. 1, the UE 350 of FIG. 3, or the UE 404 of FIG. 4. In some implementations, the operation 1220 begins after the UE transmits UL data on the second hopping channel in block 1218 of FIG. 12B. For example, during the second COT, the UE may return to the second hopping channel of the DL frequency hopping pattern at block 1222, and may receive DL data on the second hopping channel of the DL frequency hopping pattern at block 1224.

Figure 13:
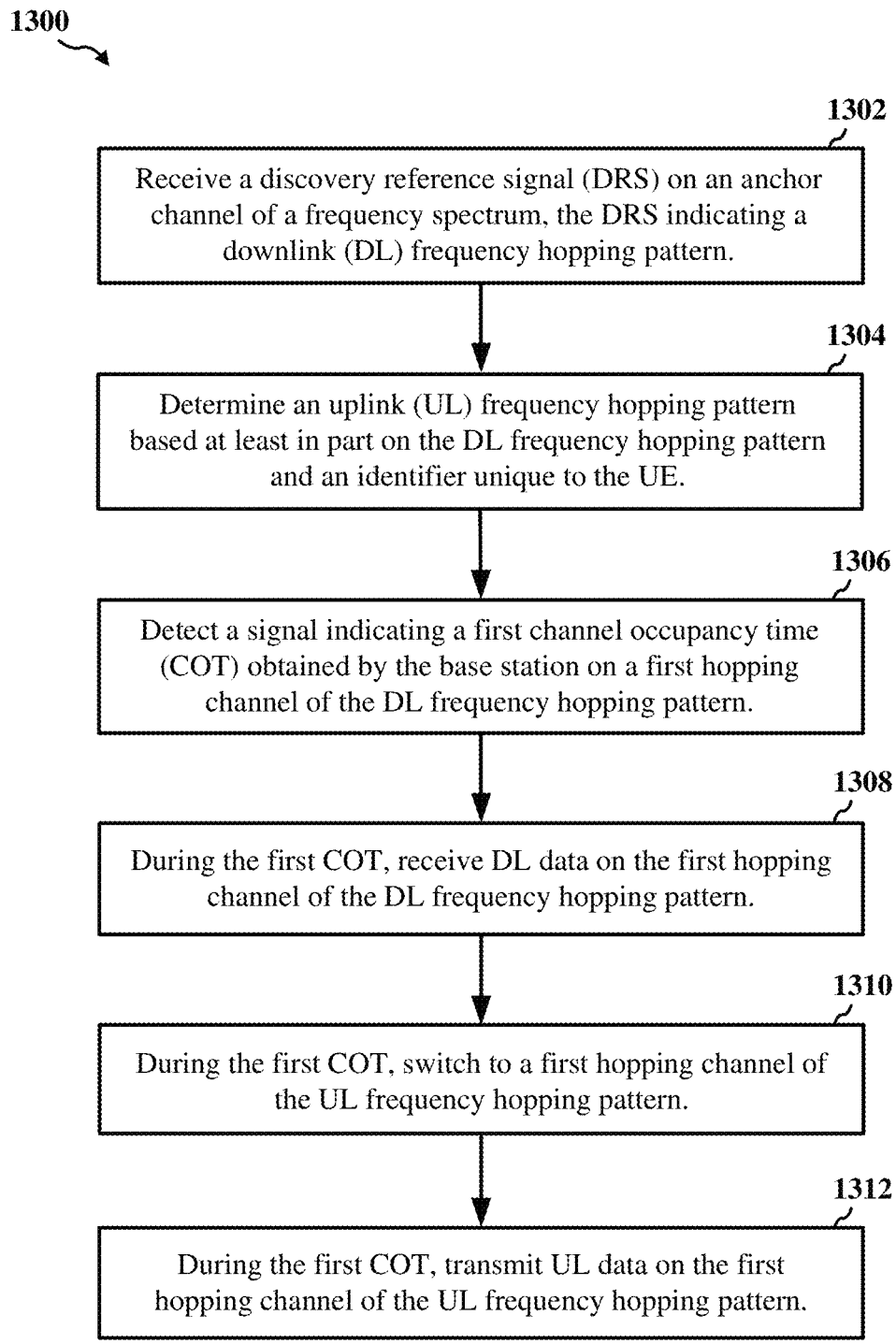
FIG. 13 shows a flowchart depicting an example operation for wireless communication that supports frequency hopping between a base station and a UE.

FIG. 13 shows a flowchart depicting an example operation 1300 for wireless communication that supports frequency hopping between a base station and a UE. The operation 1300 may be performed by a wireless communication device such as the UE 104 of FIG. 1, the UE 350 of FIG. 3, or the UE 404 of FIG. 4. At block 1302, the UE receives a discovery reference signal (DRS) on an anchor channel of a frequency spectrum, the DRS indicating a downlink (DL) frequency hopping pattern. At block 1304, the UE determines an uplink (UL) frequency hopping pattern based at least in part on the DL frequency hopping pattern and an identifier unique to the UE. At block 1306, the UE detects a signal indicating a first channel occupancy time (COT) obtained by the base station on a first hopping channel of the DL frequency hopping pattern. During the first COT, the UE receives DL data on the first hopping channel of the DL frequency hopping pattern at block 1308, switches to a first hopping channel of the UL frequency hopping pattern at block 1310, and transmits UL data on the first hopping channel of the UL frequency hopping pattern at block 1312.

The DL frequency hopping pattern may include a sequence of DL hopping channels upon which the base station may transmit DL data, and the UL frequency hopping pattern may include one or more sequences of UL hopping channels upon which one or more respective UEs may concurrently transmit UL data. Each of the DL hopping channels may be associated with a corresponding DL hopping frame within which the base station may transmit DL data to one or more UEs, and each of the UL hopping channels of a respective one of the sequences of UL hopping channels may be associated with a corresponding UL hopping frame that is allocated to a specified UE. In this manner, the DL hopping frames may carry DL data intended for any number of different UEs, and each sequence of UL hopping frames may be dedicated for UL transmissions from a corresponding UE.

In some implementations, the sequence of DL hopping frames and the one or more sequences of UL hopping channels may be uncoordinated relative to each other, for example, to avoid certain FCC restrictions on communications that employ frequency hopping techniques. In some other implementations, the sequence of DL hopping frames and the one or more sequences of UL hopping channels may be coordinated with each other, for example, to reduce a likelihood that UL hopping channels associated with different UEs do not overlap in both time and frequency. In some instances, the UEs may be configured to use a category-2 LBT procedure to gain medium access to their respective sequence of UL hopping channels.

In some implementations, the sequences of UL hopping channels used for UL transmissions by different UEs may be orthogonal to each other, and may be orthogonal to the sequence of DL hopping channels used by the base station for DL transmissions. In some implementations, a number N of orthogonal UL frequency hopping patterns may be derived from a DL frequency hopping pattern and UE-specific information (such as the UEID). For example, if c_DL (n) represents the DL hopping channel of a DL frequency hopping pattern at an instance in time n, then each of a plurality of orthogonal UL hopping channels may be determined at that instance in time n using the expression c_UL (n)=(c_DL (n)+i) mod N, where i is the pattern index for which 0≤i<N.

In some implementations, the DRS in block 1302 also may include one or more of a primary synchronization signal (PSS), a secondary synchronization signal (SSS), a physical broadcast channel (PBCH), a system information block (SIB), a slot format indicator (SFI), or remaining minimum system information (RMSI). The DRS may have a dwell time on the anchor channel based on one or more of the 3GPP standards. In some implementations, each of the DL frequency hopping pattern and the UL frequency hopping pattern includes at least 15 unique hopping channels, and each of the at least 15 unique hopping channels has a dwell time based on one or more of the 3GPP standards.

In some implementations, the UE may determine the UL frequency hopping pattern in block 1304 by applying a value constant offset in modulo to the DL frequency hopping pattern. The value may be one of an offset in modulo modified by an identifier of the UE (such as the UEID), one or more variations of the UEID, In some implementations, the signal indicating the first COT in block 1306 may be one or more of a system information channel occupancy time (SI-COT), a group-common physical downlink control channel (GC-PDCCH), or a common transmit preamble. The first COT may be obtained based on a CCA channel access procedure performed by the base station on the first hopping channel of the DL frequency hopping pattern.

In some implementations, the first hopping channel of the DL frequency hopping pattern in block 1308 may be associated with a corresponding DL hopping frame of a sequence of DL hopping frames. The DL data in block 1308 may be received using one of a physical downlink shared channel (PDSCH) or a physical downlink control channel (PDCCH).

In some implementations, the first hopping channel of the UL frequency hopping pattern in block 1312 may be associated with a corresponding UL hopping frame of a sequence of UL hopping frames. The UL data in block 1312 may be transmitted using one of a physical uplink shared channel (PUSCH) or a physical uplink control channel (PUCCH).

Figure 14A:
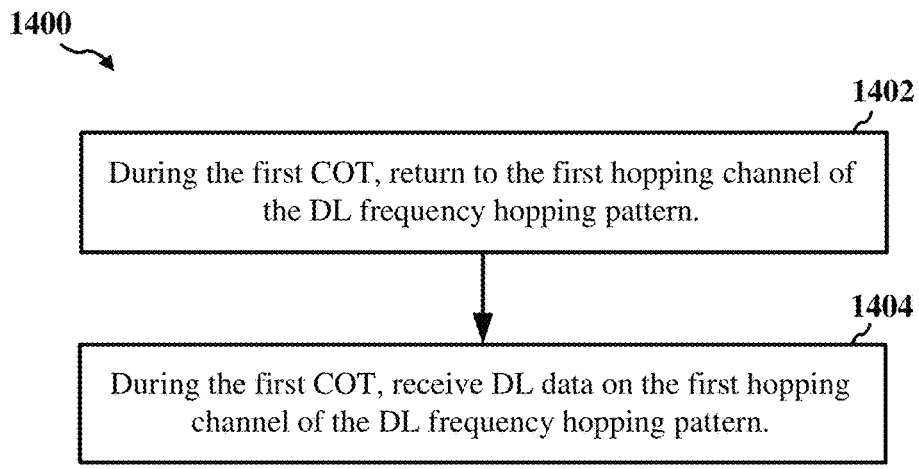
FIGS. 14A, 14B, 14C, and 14D show flowcharts depicting example operations for wireless communication that supports frequency hopping between a base station and a UE.

FIG. 14A shows a flowchart depicting an example operation 1400 for wireless communication that supports frequency hopping between a base station and a UE. The operation 1400 may be performed by a wireless communication device such as the UE 104 of FIG. 1, the UE 350 of FIG. 3, or the UE 404 of FIG. 4. In some implementations, the operation 1400 begins after the UE transmits the UL data on the first hopping channel of the UL frequency hopping pattern in block 1312 of FIG. 13. For example, during the first COT, the UE returns to the first hopping channel of the DL frequency hopping pattern at block 1402, and receives DL data on the first hopping channel of the DL frequency hopping pattern at block 1404.

Figure 14B:
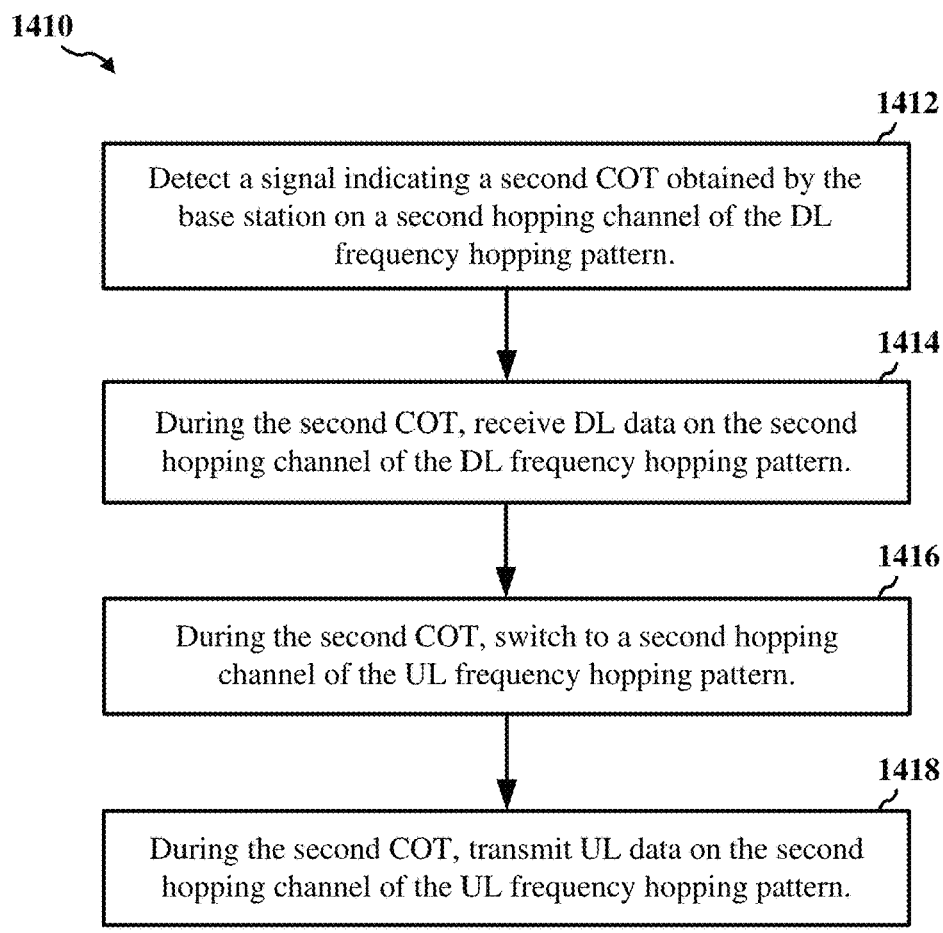

FIG. 14B shows a flowchart depicting an example operation 1410 for wireless communication that supports frequency hopping between a base station and a UE. The operation 1410 may be performed by a wireless communication device such as the UE 104 of FIG. 1, the UE 350 of FIG. 3, or the UE 404 of FIG. 4. In some implementations, the operation 1410 begins after the UE transmits the UL data on the first hopping channel of the UL frequency hopping pattern in block 1312 of FIG. 13. In some other implementations, the operation 1410 begins after the UE receives the DL data on the first hopping channel of the DL frequency hopping pattern in block 1404 of FIG. 14A. For example, at block 1412, the UE may detect a signal indicating a second COT obtained by the base station on a second hopping channel of the DL frequency hopping pattern. During the second COT, the UE receives DL data on the second hopping channel of the DL frequency hopping pattern at block 1414, switches to a second hopping channel of the UL frequency hopping pattern at block 1416, and transmits UL data on the second hopping channel of the UL frequency hopping pattern at block 1418.

Figure 14C:
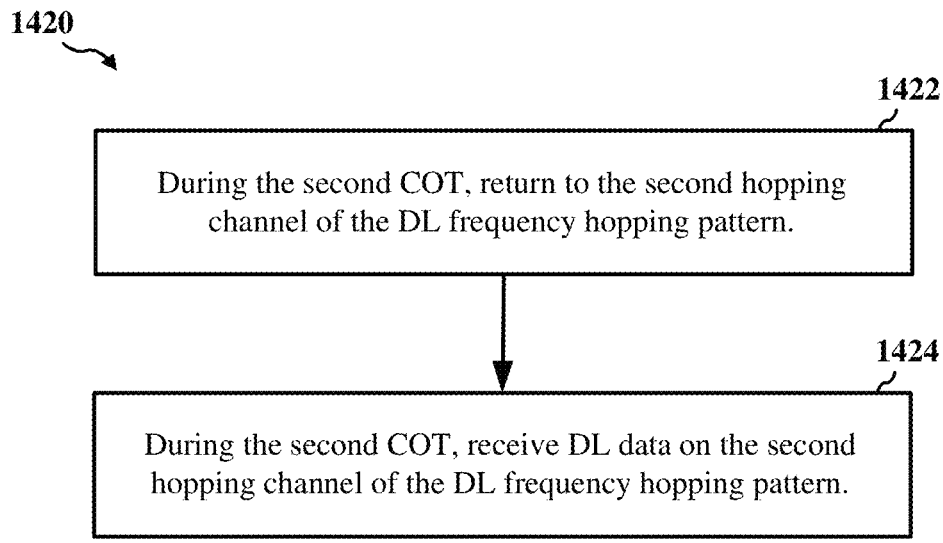

FIG. 14C shows a flowchart depicting an example operation 1420 for wireless communication that supports frequency hopping between a base station and a UE. The operation 1420 may be performed by a wireless communication device such as the UE 104 of FIG. 1, the UE 350 of FIG. 3, or the UE 404 of FIG. 4. In some implementations, the operation 1420 begins after the UE transmits UL data on the first hopping channel in block 1418 of FIG. 14B. For example, at block 1422, the UE may return to the second hopping channel of the DL frequency hopping pattern. At block 1424, the UE receives DL data on the second hopping channel of the DL frequency hopping pattern.

Figure 14D:
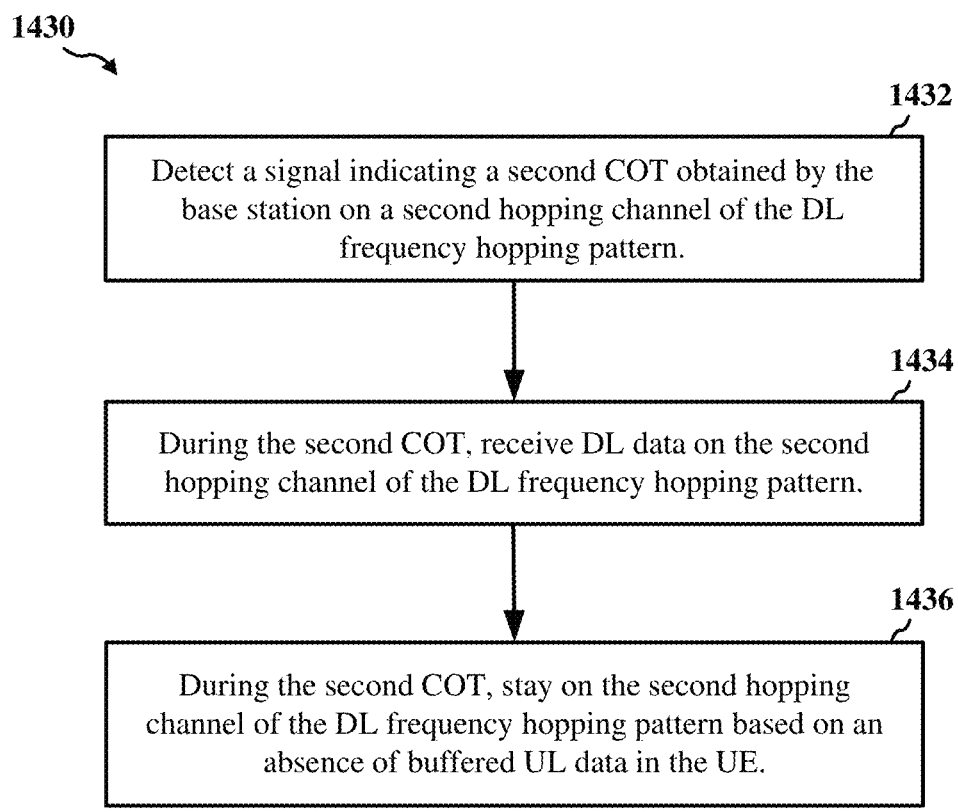

FIG. 14D shows a flowchart depicting an example operation 1430 for wireless communication that supports frequency hopping between a base station and a UE. The operation 1430 may be performed by a wireless communication device such as the UE 104 of FIG. 1, the UE 350 of FIG. 3, or the UE 404 of FIG. 4. In some implementations, the operation 1430 begins after the UE transmits the UL data on the first hopping channel of the UL frequency hopping pattern in block 1312 of FIG. 13. In some other implementations, the operation 1430 begins after the UE receives the DL data on the first hopping channel of the DL frequency hopping pattern in block 1404 of FIG. 14A. For example, at block 1432, the UE may detect a signal indicating a second COT obtained by the base station on a second hopping channel of the DL frequency hopping pattern. During the second COT, the UE receives DL data on the second hopping channel of the DL frequency hopping pattern at block 1434, and stays on the second hopping channel of the DL frequency hopping pattern based on an absence of buffered UL data in the UE at block 1436.

Figure 15:
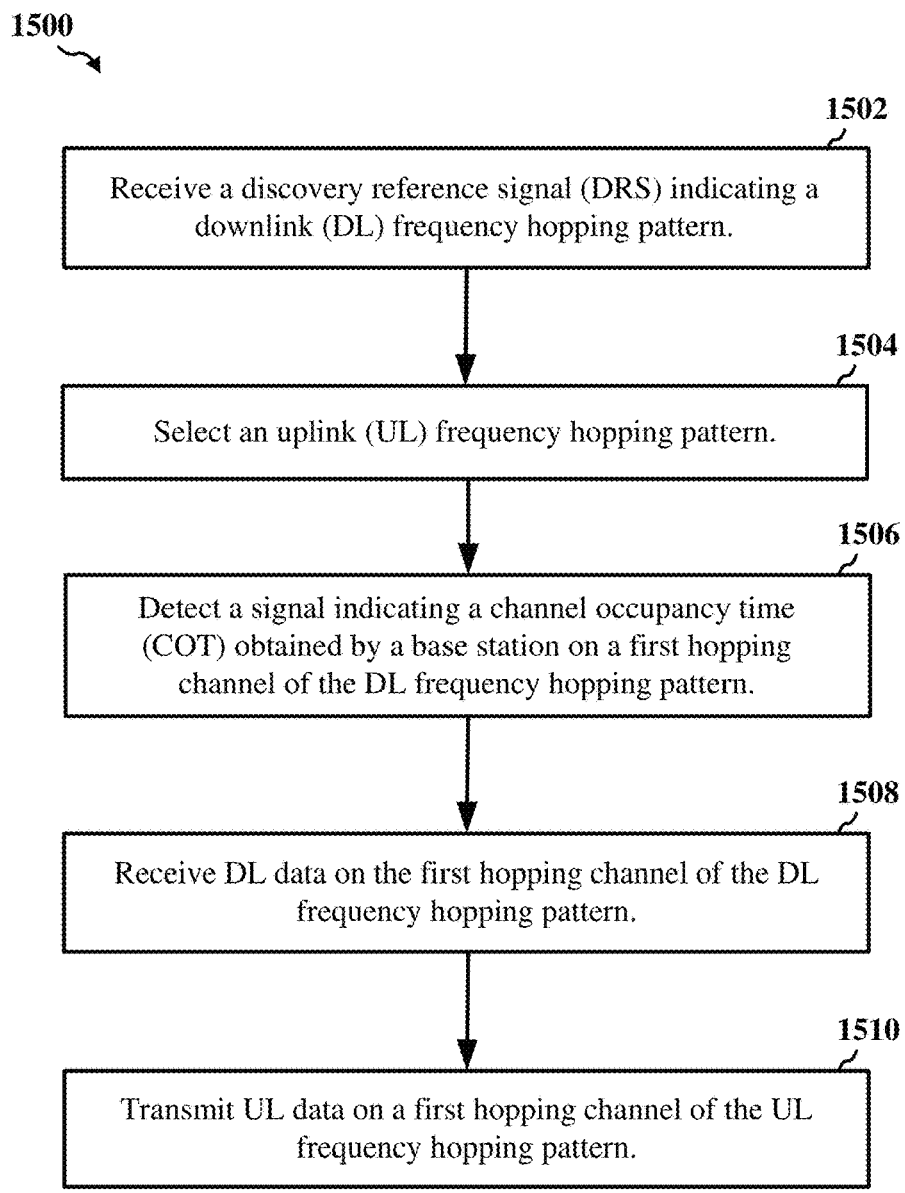
FIG. 15 shows a flowchart depicting an example operation for wireless communication that supports frequency hopping between a base station and a UE.

FIG. 15 shows a flowchart depicting an example operation 1500 for wireless communication that supports frequency hopping between a base station and a UE. The operation 1500 may be performed by a wireless communication device such as the UE 104 of FIG. 1, the UE 350 of FIG. 3, or the UE 404 of FIG. 4. At block 1502, the UE receives a discovery reference signal (DRS) indicating a downlink (DL) frequency hopping pattern. At block 1504, the UE selects an uplink (UL) frequency hopping pattern. At block 1506, the UE detects a signal indicating a channel occupancy time (COT) obtained by the base station on a first hopping channel of the DL frequency hopping pattern. At block 1508, the UE receives DL data on the first hopping channel of the DL frequency hopping pattern. At block 1510, the UE transmits UL data on a first hopping channel of the UL frequency hopping pattern. In some implementations, the UE may receive the DL data on the first hopping channel of the DL frequency hopping pattern concurrently with transmitting the UL data on the first hopping channel of the UL frequency hopping pattern. In some instances, the first hopping channel of the UL frequency hopping pattern may be configured to carry time-multiplexed UL data or frequency-multiplexed UL data transmitted from the UE and from one or more other UEs during a first COT period.

In some implementations, the selection of the UL frequency hopping pattern may be based on the DL frequency hopping pattern and at least one of a cell identifier, a user equipment identifier (UE ID), or a group UE identifier. In some instances, the at least one of the cell identifier, the UE ID, or the group UE identifier may be received in one or more of a radio resource control (RRC) configuration, a downlink control information (DCI) message, or the DRS. In some other implementations, the DL frequency hopping pattern may be a cell-specific frequency hopping pattern, and selecting the UL frequency hopping pattern may include applying a constant offset in modulo to the DL frequency hopping pattern. In some other implementations, the DL frequency hopping pattern may be a cell-specific frequency hopping pattern, and the UL frequency hopping pattern may be based on the DL frequency hopping pattern, a user equipment identifier (UE ID), and a slot index.

In some implementations, the DRS in block 1502 also may include one or more of a primary synchronization signal (PSS), a secondary synchronization signal (SSS), a physical broadcast channel (PBCH), a system information block (SIB), a slot format indicator (SFI), or remaining minimum system information (RMSI). In some instances, the DRS may be received over an anchor channel, and the DRS may have a dwell time on the anchor channel based on one or more of the 3GPP standards. In some implementations, each of the DL frequency hopping pattern and the UL frequency hopping pattern may include at least 15 unique hopping channels, and each of the at least 15 unique hopping channels may have a dwell time based on one or more of the 3GPP standards.

In some implementations, the signal indicating the COT in block 1504 may be one or more of a system information channel occupancy time (SI-COT), a group-common physical downlink control channel (GC-PDCCH), or a common transmit preamble. In some instances, the COT may be obtained by the base station based on a clear channel assessment (CCA) channel access procedure performed on the first hopping channel of the DL frequency hopping pattern.

In some implementations, the DL data in block 1508 may be received over one of a physical downlink shared channel (PDSCH) or a physical downlink control channel (PDCCH). In some other implementations, the UL data in block 1510 may be transmitted over one of a physical uplink shared channel (PUSCH) or a physical uplink control channel (PUCCH).

Figure 16:
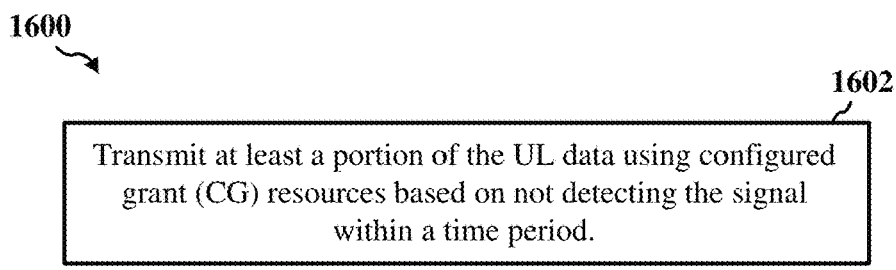
FIG. 16 shows a flowchart depicting an example operation for wireless communication that supports frequency hopping between a base station and a UE.

FIG. 16 shows a flowchart depicting an example operation 1600 for wireless communication that supports frequency hopping between a base station and a UE. The operation 1600 may be performed by a wireless communication device such as the UE 104 of FIG. 1, the UE 350 of FIG. 3, or the UE 404 of FIG. 4. In some implementations, the operation 1600 begins after the UE selects the UL frequency hopping pattern in block 1504 of FIG. 15. For example, at block 1602, the UE may transmit at least a portion of the UL data using configured grant (CG) resources based on not detecting the signal within a time period.

Figure 17:
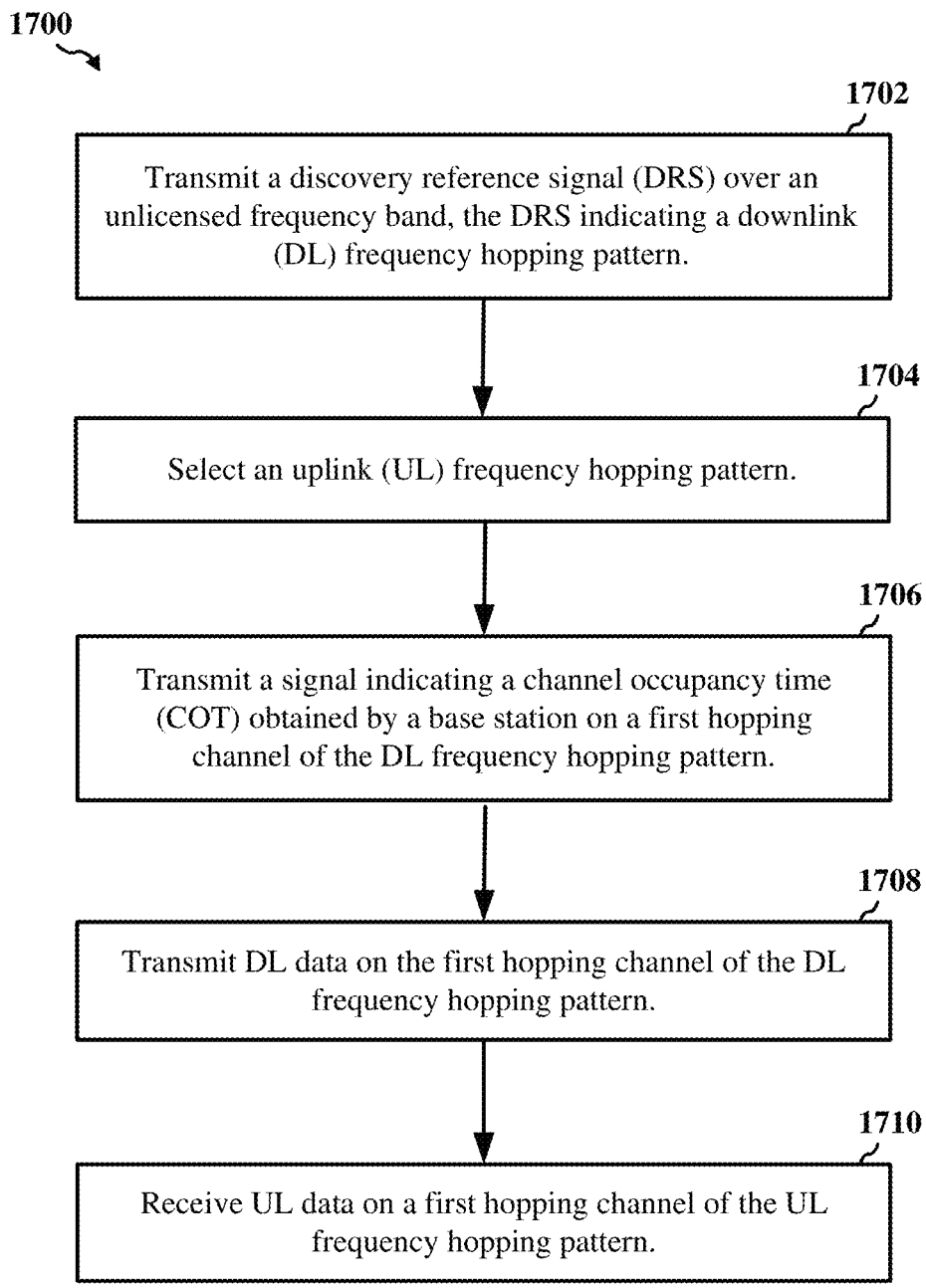
FIG. 17 shows a flowchart depicting an example operation for wireless communication that supports frequency hopping between a base station and a UE.

FIG. 17 shows a flowchart depicting an example operation 1700 for wireless communication that supports frequency hopping between a BS and a UE. The operation 1700 may be performed by a wireless communication device such as the BS 102 of FIG. 1, the BS 310 of FIG. 3, or the BS 402 of FIG. 4. At block 1702, the BS transmits a discovery reference signal (DRS) over an unlicensed frequency band, the DRS indicating a downlink (DL) frequency hopping pattern. At block 1704, the BS selects an uplink (UL) frequency hopping pattern. At block 1706, the BS transmits a signal indicating a channel occupancy time (COT) obtained on a first hopping channel of the DL frequency hopping pattern. At block 1708, the BS transmits DL data on the first hopping channel of the DL frequency hopping pattern. At block 1710, the BS receives UL data on a first hopping channel of the UL frequency hopping pattern. In some implementations, the BS may transmit the DL data on the first hopping channel of the DL frequency hopping pattern concurrently with receiving the UL data on the first hopping channel of the UL frequency hopping pattern. In some instances, the first hopping channel of the UL frequency hopping pattern may be configured to carry time-multiplexed UL data or frequency-multiplexed UL data received from a plurality of different UEs during a first COT period.

In some implementations, the selection of the UL frequency hopping pattern may be based on the DL frequency hopping pattern and at least one of a cell identifier, a user equipment identifier (UE ID), or a group UE identifier. In some instances, the at least one of the cell identifier, the UE ID, or the group UE identifier may be provided to one or more UEs in one or more of a radio resource control (RRC) configuration, a downlink control information (DCI) message, or the DRS. In some other implementations, the DL frequency hopping pattern may be a cell-specific frequency hopping pattern, and selecting the UL frequency hopping pattern may include applying a constant offset in modulo to the DL frequency hopping pattern. In some other implementations, the DL frequency hopping pattern may be a cell-specific frequency hopping pattern, and the UL frequency hopping pattern may be based on the DL frequency hopping pattern, a user equipment identifier (UE ID), and a slot index.

In some implementations, the DRS in block 1702 also may include one or more of a primary synchronization signal (PSS), a secondary synchronization signal (SSS), a physical broadcast channel (PBCH), a system information block (SIB), a slot format indicator (SFI), or remaining minimum system information (RMSI). In some instances, the DRS may be transmitted over an anchor channel, and the DRS may have a dwell time on the anchor channel based on one or more of the 3GPP standards. In some implementations, each of the DL frequency hopping pattern and the UL frequency hopping pattern may include at least 15 unique hopping channels, and each of the at least 15 unique hopping channels may have a dwell time based on one or more of the 3GPP standards.

In some implementations, the signal indicating the COT in block 1704 may be one or more of a system information channel occupancy time (SI-COT), a group-common physical downlink control channel (GC-PDCCH), or a common transmit preamble. In some instances, the COT may be obtained based on a clear channel assessment (CCA) procedure performed on the first hopping channel of the DL frequency hopping pattern.

In some implementations, the DL data in block 1708 may be transmitted over one of a physical downlink shared channel (PDSCH) or a physical downlink control channel (PDCCH). In some other implementations, the UL data in block 1710 may be received over one of a physical uplink shared channel (PUSCH) or a physical uplink control channel (PUCCH).

Figure 18:
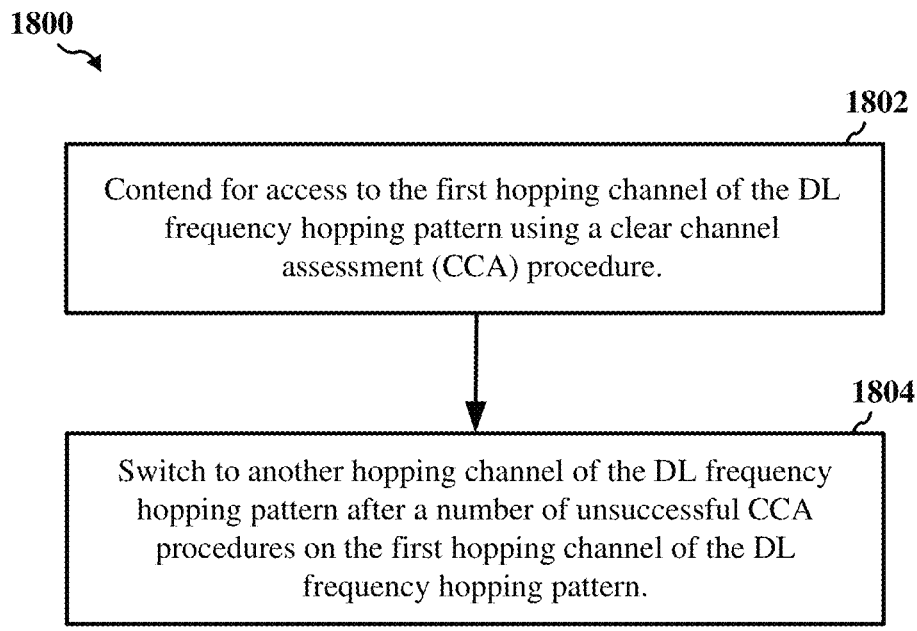
FIG. 18 shows a flowchart depicting an example operation for wireless communication that supports frequency hopping between a base station and a UE.

FIG. 18 shows a flowchart depicting an example operation 1800 for wireless communication that supports frequency hopping between a BS and a UE. The operation 1800 may be performed by a wireless communication device such as the BS 102 of FIG. 1, the BS 310 of FIG. 3, or the BS 402 of FIG. 4. In some implementations, the operation 1800 begins after the BS transmits the signal in block 1706 of FIG. 17. For example, at block 1802, the BS may contend for access to the first hopping channel of the DL frequency hopping pattern using a clear channel assessment (CCA) procedure. At block 1804, the BS may switch to another hopping channel of the DL frequency hopping pattern after a number of unsuccessful CCA procedures on the first hopping channel of the DL frequency hopping pattern.

Figure 19:
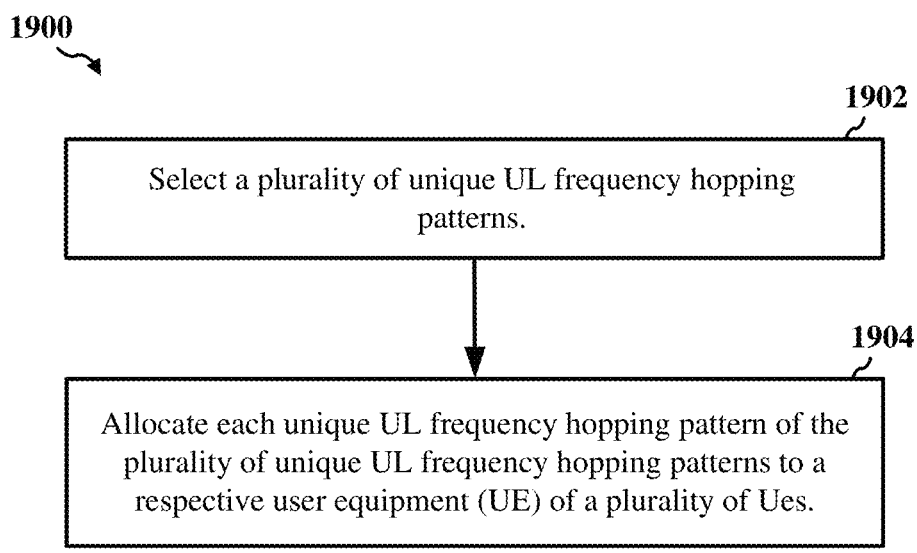
FIG. 19 shows a flowchart depicting an example operation for wireless communication that supports frequency hopping between a base station and a UE.

FIG. 19 shows a flowchart depicting an example operation 1900 for wireless communication that supports frequency hopping between a BS and a UE. The operation 1900 may be performed by a wireless communication device such as the BS 102 of FIG. 1, the BS 310 of FIG. 3, or the BS 402 of FIG. 4. In some implementations, the operation 1900 may be one example of selecting the UL frequency hopping pattern in block 1704 of FIG. 17. For example, at block 1902, the BS may select a plurality of unique UL frequency hopping patterns. At block 1904, the BS may allocate each unique UL frequency hopping pattern of the plurality of unique UL frequency hopping patterns to a respective user equipment (UE) of a plurality of UEs.

Implementation examples are described in the following numbered clauses:

1. A method for wireless communication performed by an apparatus of a user equipment (UE), including:
   receiving a discovery reference signal (DRS) indicating a downlink (DL) frequency hopping pattern;
   selecting an uplink (UL) frequency hopping pattern;
   detecting a signal indicating a channel occupancy time (COT) obtained by a base station on a first hopping channel of the DL frequency hopping pattern;
   receiving DL data on the first hopping channel of the DL frequency hopping pattern; and
   transmitting UL data on a first hopping channel of the UL frequency hopping pattern.

2. The method of clause 1, wherein the selection of the UL frequency hopping pattern is based on the DL frequency hopping pattern and at least one of a cell identifier, a user equipment identifier (UE ID), or a group UE identifier.

3. The method of clause 2, wherein the at least one of the cell identifier, the UE ID, or the group UE identifier is received in one or more of a radio resource control (RRC) configuration, a downlink control information (DCI) message, or the DRS.

4. The method of clause 1, wherein the DL frequency hopping pattern includes a cell-specific frequency hopping pattern, and selecting the UL frequency hopping pattern includes applying a constant offset in modulo to the DL frequency hopping pattern.

5. The method of clause 1, wherein the DL frequency hopping pattern includes a cell-specific frequency hopping pattern, and the UL frequency hopping pattern is based on the DL frequency hopping pattern, a user equipment identifier (UE ID), and a slot index.

6. The method of any of clauses 1-5, further including:
   transmitting at least a portion of the UL data using configured grant (CG) resources based on not detecting the signal within a time period.

7. The method of any of clauses 1-6, wherein the signal includes one or more of a system information channel occupancy time (SI-COT), a group-common physical downlink control channel (GC-PDCCH), or a common transmit preamble.

8. The method of any of clauses 1-7, wherein the DRS is received over an anchor channel of an unlicensed frequency band.

9. The method of any of clauses 1-8, wherein the UE receives the DL data on the first hopping channel of the DL frequency hopping pattern concurrently with transmitting the UL data on the first hopping channel of the UL frequency hopping pattern.

10. The method of any of clauses 1-9, wherein the first hopping channel of the UL frequency hopping pattern is configured to carry time-multiplexed UL data or frequency-multiplexed UL data transmitted from the UE and from one or more other UEs during a first COT period.

11. The method of any of clauses 1-10, wherein the COT is obtained based on a clear channel assessment (CCA) on the first hopping channel of the DL frequency hopping pattern.

12. A wireless communication device, including:
   an interface configured to:
   obtain a discovery reference signal (DRS) indicating a downlink (DL) frequency hopping pattern; and
   a processing system configured to:
   select an uplink (UL) frequency hopping pattern; and
   the interface further configured to:
   obtain a signal indicating a channel occupancy time (COT) obtained by a base station on a first hopping channel of the DL frequency hopping pattern;
   obtain DL data on the first hopping channel of the DL frequency hopping pattern; and output UL data for transmission on a first hopping channel of the UL frequency hopping pattern.

13. The wireless communication device of clause 12, wherein the selection of the UL frequency hopping pattern is based on the DL frequency hopping pattern and at least one of a cell identifier, a user equipment identifier (UEID), or a group UE identifier.

14. The wireless communication device of clause 12, wherein the DL frequency hopping pattern includes a cell-specific frequency hopping pattern, and selecting the UL frequency hopping pattern includes applying a constant offset in modulo to the DL frequency hopping pattern.

15. The wireless communication device of clause 12, wherein the DL frequency hopping pattern includes a cell-specific frequency hopping pattern, and the UL frequency hopping pattern is based on the DL frequency hopping pattern, a user equipment identifier (UE ID), and a slot index.

16. The wireless communication device of any of clauses 12-15, wherein the wireless communication device receives the DL data on the first hopping channel of the DL frequency hopping pattern concurrently with transmitting the UL data on the first hopping channel of the UL frequency hopping pattern.

17. A method for wireless communication performed by an apparatus of a base station (BS), including:
transmitting a discovery reference signal (DRS) over an unlicensed frequency band, the DRS indicating a downlink (DL) frequency hopping pattern;
selecting an uplink (UL) frequency hopping pattern;
transmitting a signal indicating a channel occupancy time (COT) obtained on a first hopping channel of the DL frequency hopping pattern;
transmitting DL data on the first hopping channel of the DL frequency hopping pattern; and
receiving UL data on a first hopping channel of the UL frequency hopping pattern.

18. The method of clause 17, wherein the selection of the UL frequency hopping pattern is based on the DL frequency hopping pattern and at least one of a cell identifier, a user equipment identifier (UE ID), or a group UE identifier.

19. The method of clause 17, wherein the DL frequency hopping pattern includes a cell-specific frequency hopping pattern, and selecting the UL frequency hopping pattern includes applying a constant offset in modulo to the DL frequency hopping pattern.

20. The method of clause 17, wherein the DL frequency hopping pattern includes a cell-specific frequency hopping pattern, and the UL frequency hopping pattern is based on the DL frequency hopping pattern, a user equipment identifier (UE ID), and a slot index.

21. The method of any of clauses 17-20, wherein the signal includes one or more of a system information channel occupancy time (SI-COT), a group-common physical downlink control channel (GC-PDCCH), or a common transmit preamble.

22. The method of any of clauses 17-21, wherein transmitting the DL data further includes:
contending for access to the first hopping channel of the DL frequency hopping pattern using a clear channel assessment (CCA) procedure; and
switching to another hopping channel of the DL frequency hopping pattern after a number of unsuccessful CCA procedures on the first hopping channel of the DL frequency hopping pattern.

23. The method of any of clauses 17-22, wherein the first hopping channel of the UL frequency hopping pattern is configured to carry time-multiplexed UL data or frequency-multiplexed UL data transmitted from the UE and from one or more other UEs during a first COT period.

24. The method of any of clauses 17-23, further including:
selecting a plurality of unique UL frequency hopping patterns; and
allocating each unique UL frequency hopping pattern of the plurality of unique UL frequency hopping patterns to a respective user equipment (UE) of a plurality of UEs.

25. The method of clause 24, wherein each unique UL frequency hopping pattern is based at least in part on the DL frequency hopping pattern and a unique identifier of the respective UE.

26. A wireless communication device, including:
an interface configured to:
output a discovery reference signal (DRS) for transmission over an unlicensed frequency band, the DRS indicating a downlink (DL) frequency hopping pattern and an identifier; and
output a signal indicating a channel occupancy time (COT) obtained on a first hopping channel of the DL frequency hopping pattern; and
a processing system configured to:
select an uplink (UL) frequency hopping pattern; and
the interface further configured to:
output DL data for transmission on the first hopping channel of the DL frequency hopping pattern; and
obtain UL data on a first hopping channel of the UL frequency hopping pattern.

27. The wireless communication device of clause 26, wherein the selection of the UL frequency hopping pattern is based on the DL frequency hopping pattern and at least one of a cell identifier, a user equipment identifier (UEID), or a group UE identifier.

28. The wireless communication device of any of clauses 26-27, wherein the interface is further configured to:
contend for access to the first hopping channel of the DL frequency hopping pattern using a clear channel assessment (CCA) procedure; and
switch to another hopping channel of the DL frequency hopping pattern after a number of unsuccessful CCA procedures on the first hopping channel of the DL frequency hopping pattern.

29. The wireless communication device of any of clauses 26-28, wherein the processing system is further configured to:
select a plurality of unique UL frequency hopping patterns; and
allocate each unique UL frequency hopping pattern of the plurality of unique UL frequency hopping patterns to a respective user equipment (UE) of a plurality of UEs.

30. The wireless communication device of clause 29, wherein each unique UL frequency hopping pattern is based at least in part on the DL frequency hopping pattern and a unique identifier of the respective UE.

31. A method for wireless communication performed by an apparatus of a user equipment (UE), including:
receiving a discovery reference signal (DRS) on an anchor channel of a frequency spectrum, the DRS indicating at least one of a downlink (DL) frequency hopping pattern or an uplink (UL) frequency hopping pattern;

detecting a signal indicating a channel occupancy time (COT) obtained by a base station on a first hopping channel of the DL frequency hopping pattern; and receiving DL data on the first hopping channel of the DL frequency hopping pattern concurrently with transmitting UL data on a first hopping channel of the UL frequency hopping pattern.

32. The method of clause 31, further including:

transmitting at least a portion of the UL data using configured grant (CG) resources based on not detecting the signal within a time period.

33. The method of any of clauses 31-32, wherein the DRS indicates the DL frequency hopping pattern, the method further including:

deriving the UL frequency hopping pattern based on the DL frequency hopping pattern.

34. The method of clause 33, wherein the UL frequency hopping pattern is derived by applying a constant offset in modulo to the DL frequency hopping pattern.

35. The method of clause 31, wherein the DL frequency hopping pattern includes a first sequence of hopping channels, and the UL frequency hopping pattern includes a second sequence of hopping channels different than the first sequence of hopping channels.

36. The method of clause 35, wherein each hopping channel of the first sequence of hopping channels is separated from a corresponding hopping channel of the second sequence of hopping channels by at least a gap frequency.

37. The method of any of clauses 35-36, wherein each hopping channel of the first sequence of hopping channels is associated with a corresponding DL hopping frame of a sequence of DL hopping frames, and each hopping channel of the second sequence of hopping channels is associated with a corresponding UL hopping frame of a sequence of UL hopping frames.

38. The method of any of clauses 35-37, wherein the frequency spectrum includes an unlicensed frequency band in the 2.4 GHz frequency spectrum, each hopping channel of the first sequence of hopping channels has a bandwidth not greater than 5 MHz, and each hopping channel of the second sequence of hopping channels has a bandwidth not greater than 5 MHz.

39. The method of any of clauses 35-38, wherein the DRS has a dwell time on the anchor channel based on one or more of the 3GPP standards, each of the DL frequency hopping pattern and the UL frequency hopping pattern includes at least 15 unique hopping channels, and each of the at least 15 unique hopping channels has a dwell time based on one or more of the 3GPP standards.

40. The method of clause 31, wherein each of the DL frequency hopping pattern and the UL frequency hopping pattern is based at least in part on a cell ID and a slot index.

41. The method of clause 31, wherein the DL frequency hopping pattern includes a cell-specific frequency hopping pattern, and the UL frequency hopping pattern includes the DL frequency hopping pattern with a constant offset in modulo.

42. The method of any of clauses 31-41, wherein the signal includes one or more of a system information channel occupancy time (SI-COT), a group-common physical downlink control channel (GC-PDCCH), or a common transmit preamble.

43. The method of any of clauses 31-42, wherein the DRS includes one or more of a primary synchronization signal (PSS), a secondary synchronization signal (SSS), a physical broadcast channel (PBCH), or a system information block (SIB).

44. The method of any of clauses 31-43, wherein the DRS includes a slot format indicator (SFI).

45. The method of any of clauses 31-44, wherein the DRS includes remaining minimum system information (RMSI) indicating the at least one of the DL frequency hopping pattern or the UL frequency hopping pattern.

46. The method of any of clauses 31-45, wherein the COT is obtained based on a clear channel assessment (CCA) on the first hopping channel of the DL frequency hopping pattern.

47. The method of clause 46, wherein transmitting the UL data further includes:

contending for access to the first hopping channel of the UL frequency hopping pattern using a CCA-based channel access procedure.

48. The method of clause 47, further including:

switching to another hopping channel of the UL frequency hopping pattern after a number of unsuccessful CCA-based channel access procedures on the first hopping channel of the UL frequency hopping pattern.

49. The method of any of clauses 31-48, wherein the UE is configured for full-duplex communications.

50. A user equipment (UE), including:

one or more processors; and a memory coupled to the one or more processors and storing instructions that, when executed by the one or more processors, cause the UE to perform the operations of any one or more of clauses 31-49.

51. A user equipment (UE) including means for performing the operations of any one or more of clauses 31-49.

52. A non-transitory computer-readable memory including instructions that, when executed by one or more processors of a user equipment (UE), cause the UE to perform the operations of any one or more of clauses 31-49.

53. A method for wireless communication performed by a user equipment (UE), including:

receiving a discovery reference signal (DRS) on an anchor channel of a frequency spectrum, the DRS indicating at least one of a downlink (DL) frequency hopping pattern or an uplink (UL) frequency hopping pattern;

detecting a signal indicating a first channel occupancy time (COT) obtained by a base station on a first hopping channel of the DL frequency hopping pattern; and during the first COT:

receiving DL data on the first hopping channel of the DL frequency hopping pattern;

switching to a first hopping channel of the UL frequency hopping pattern; and transmitting UL data on the first hopping channel of the UL frequency hopping pattern.

54. The method of clause 53, wherein the UL data is transmitted using one of a physical uplink shared channel (PUSCH) or a physical uplink control channel (PUCCH).

55. The method of any of clauses 53-54, wherein the DL data is received using one of a physical downlink shared channel (PDSCH) or a physical downlink control channel (PDCCH).

56. The method of any of clauses 53-55, further including:

during the first COT:

returning to the first hopping channel of the DL frequency hopping pattern; and receiving DL data on the first hopping channel of the DL frequency hopping pattern.

57. The method of any of clauses 53-56, further including:
detecting a signal indicating a second COT obtained by the base station on a second hopping channel of the DL frequency hopping pattern; and
during the second COT:
receiving DL data on the second hopping channel of the DL frequency hopping pattern;
switching to a second hopping channel of the UL frequency hopping pattern; and
transmitting UL data on the second hopping channel of the UL frequency hopping pattern.

58. The method of clause 57, further including:
during the second COT:
returning to the second hopping channel of the DL frequency hopping pattern; and
receiving DL data on the second hopping channel of the DL frequency hopping pattern.

59. The method of clause 53, wherein the DRS indicates the DL frequency hopping pattern, the method further including:
deriving the UL frequency hopping pattern by applying a constant offset in modulo to the DL frequency hopping pattern.

60. The method of any of clauses 53-59, wherein the DL frequency hopping pattern includes a first sequence of hopping channels, and the UL frequency hopping pattern includes a second sequence of hopping channels different than the first sequence of hopping channels.

61. The method of clause 60, wherein each hopping channel of the first sequence of hopping channels is separated from a corresponding hopping channel of the second sequence of hopping channels by a constant frequency gap.

62. The method of clause 61, wherein the constant frequency gap is based on a modulo operation of the DL frequency hopping pattern.

63. The method of any of clauses 60-62, wherein each hopping channel of the first sequence of hopping channels is associated with a corresponding DL hopping frame of a sequence of DL hopping frames, and each hopping channel of the second sequence of hopping channels is associated with a corresponding UL hopping frame of a sequence of UL hopping frames.

64. The method of any of clauses 53-63, wherein at least one DL hopping frame of the sequence of DL hopping frames contains DL data for one or more wireless communication devices other than the UE.

65. The method of clause 53, wherein each of the DL frequency hopping pattern and the UL frequency hopping pattern is based at least in part on a cell ID and a slot index.

66. The method of clause 53, wherein the DL frequency hopping pattern includes a cell-specific frequency hopping pattern, and the UL frequency hopping pattern is derived by applying a constant offset in modulo to the DL frequency hopping pattern.

67. The method of any of clauses 53-66, wherein the signal includes one or more of a system information channel occupancy time (SI-COT), a group-common physical downlink control channel (GC-PDCCH), or a common transmit preamble.

68. The method of any of clauses 53-67, wherein the DRS includes one or more of a primary synchronization signal (PSS), a secondary synchronization signal (SSS), a physical broadcast channel (PBCH), or a system information block (SIB).

69. The method of any of clauses 53-68, wherein the DRS includes a slot format indicator (SFI).

70. The method of any of clauses 53-69, wherein the DRS includes remaining minimum system information (RMSI) indicating the at least one of the DL frequency hopping pattern or the UL frequency hopping pattern.

71. The method of any of clauses 53-70, wherein the UE is configured for half-duplex communications.

72. A user equipment (UE), including:
one or more processors; and
a memory coupled to the one or more processors and storing instructions that, when executed by the one or more processors, cause the UE to perform the operations of any one or more of clauses 53-71.

73. A user equipment (UE) including means for performing the operations of any one or more of clauses 53-71.

74. A non-transitory computer-readable memory including instructions that, when executed by one or more processors of a user equipment (UE), cause the UE to perform the operations of any one or more of clauses 53-71.

75. A method for wireless communication performed by a user equipment (UE), including:
receiving a discovery reference signal (DRS) on an anchor channel of a frequency spectrum, the DRS indicating a downlink (DL) frequency hopping pattern;
determining an uplink (UL) frequency hopping pattern based at least in part on the DL frequency hopping pattern and an identifier unique to the UE;
detecting a signal indicating a first channel occupancy time (COT) obtained by a base station on a first hopping channel of the DL frequency hopping pattern; and
during the first COT:
receiving DL data on the first hopping channel of the DL frequency hopping pattern;
switching to a first hopping channel of the determined UL frequency hopping pattern; and
transmitting UL data on the first hopping channel of the determined UL frequency hopping pattern.

76. The method of clause 75, wherein the UL data is transmitted using one of a physical uplink shared channel (PUSCH) or a physical uplink control channel (PUCCH).

77. The method of any of clauses 75-76, wherein the DL data is received using one of a physical downlink shared channel (PDSCH) or a physical downlink control channel (PDCCH).

78. The method of any of clauses 75-77, further including:
during the first COT:
returning to the first hopping channel of the DL frequency hopping pattern; and
receiving DL data on the first hopping channel of the DL frequency hopping pattern.

79. The method of clause 78, further including:
detecting a signal indicating a second COT obtained by the base station on a second hopping channel of the DL frequency hopping pattern; and
during the second COT:
receiving DL data on the second hopping channel of the DL frequency hopping pattern;
switching to a second hopping channel of the determined UL frequency hopping pattern; and
transmitting UL data on the second hopping channel of the determined UL frequency hopping pattern.

80. The method of clause 79, further including:
during the second COT:
   returning to the second hopping channel of the DL frequency hopping pattern; and
   receiving DL data on the second hopping channel of the DL frequency hopping pattern.
81. The method of clause 75, further including:
detecting a signal indicating a second COT obtained by the base station on a second hopping channel of the DL frequency hopping pattern; and
during the second COT:
   receiving DL data on the second hopping channel of the DL frequency hopping pattern; and
   staying on the second hopping channel of the DL frequency hopping pattern based on an absence of buffered UL data in the UE.
82. The method of any of clauses 75-81, wherein the DL frequency hopping pattern includes a first sequence of hopping channels, and the determined UL frequency hopping pattern includes a second sequence of hopping channels different than the first sequence of hopping channels.
83. The method of clause 82, wherein:
each hopping channel of the first sequence of hopping channels is associated with a corresponding DL hopping frame of a sequence of DL hopping frames;
each hopping channel of the second sequence of hopping channels is associated with a corresponding UL hopping frame of a sequence of UL hopping frames;
one or more of the DL hopping frames of the sequence of DL hopping frames contains DL data for at least one wireless communication device other than the UE; and
each UL hopping frame of the sequence of UL hopping frames is dedicated for UL transmissions from the UE.
84. The method of any of clauses 75-83, wherein the signal includes one or more of a system information channel occupancy time (SI-COT), a group-common physical downlink control channel (GC-PDCCH), or a common transmit preamble.
85. The method of any of clauses 75-84, wherein the DRS includes one or more of a primary synchronization signal (PSS), a secondary synchronization signal (SSS), a physical broadcast channel (PBCH), or a system information block (SIB).
86. The method of any of clauses 75-85, wherein the DRS includes a slot format indicator (SFI).
87. The method of any of clauses 75-86, wherein the DRS includes remaining minimum system information (RMSI) indicating the DL frequency hopping pattern.
88. The method of any of clauses 75-87, wherein the UE is configured for half-duplex communications.
89. The method of any of clauses 75-88, further including:
detecting a collision on the first hopping channel of the determined UL frequency hopping pattern; and
transmitting the UL data on a second hopping channel of the determined UL frequency hopping pattern.
90. The method of clause 89, wherein the second hopping channel of the determined UL frequency hopping pattern includes time-multiplexed UL data or frequency-multiplexed data from one or more wireless communication devices other than the UE.
91. The method of any of clauses 75-90, wherein the determined UL frequency hopping pattern includes one UL frequency hopping pattern of a plurality of different UL frequency hopping patterns.
92. The method of clause 91, wherein each UL frequency hopping pattern of the plurality of different UL frequency hopping patterns is allocated to a corresponding UE of a plurality of UEs.
93. The method of clause 92, wherein each UL frequency hopping pattern of the plurality of different UL frequency hopping patterns is based at least in part on the DL frequency hopping pattern and an identifier unique to the corresponding UE of the plurality of UEs.
94. The method of any of clauses 91-93, wherein the plurality of different UL frequency hopping patterns are uncoordinated with respect to each other.
95. The method of any of clauses 75-94, wherein the determined UL frequency hopping pattern includes an orthogonal UL frequency hopping pattern of a plurality of orthogonal UL frequency hopping patterns.
96. The method of any of clauses 75-95, wherein each orthogonal UL frequency hopping pattern of the plurality of orthogonal UL frequency hopping patterns is allocated to a corresponding UE of a plurality of UEs.
97. The method of clause 96, wherein each orthogonal UL frequency hopping pattern of the plurality of orthogonal UL frequency hopping patterns is based at least in part on a modulo of the DL frequency hopping pattern and an identifier unique to the corresponding UE of the plurality of UEs.
98. The method of any of clauses 95-97, wherein the plurality of orthogonal UL frequency hopping patterns are coordinated with respect to each other.
99. A user equipment (UE), including:
one or more processors; and
a memory coupled to the one or more processors and storing instructions that, when executed by the one or more processors, cause the UE to perform the operations of any one or more of clauses 75-98.
100. A user equipment (UE) including means for performing the operations of any one or more of clauses 75-98.
101. A non-transitory computer-readable memory including instructions that, when executed by one or more processors of a user equipment (UE), cause the UE to perform the operations of any one or more of clauses 75-98.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices (such as a combination of a DSP and a microprocessor), a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method for wireless communication performed by an apparatus of a user equipment (UE), comprising:
    receiving a discovery reference signal (DRS) indicating a downlink (DL) frequency hopping pattern;
    receiving a signal indicating a channel occupancy time (COT) obtained by a base station on a first hopping channel of the DL frequency hopping pattern;
    receiving DL data on the first hopping channel of the DL frequency hopping pattern; and
    transmitting uplink (UL) data on a first hopping channel of an UL frequency hopping pattern, wherein the first hopping channel of the UL frequency hopping pattern is based on, and different from, the first hopping channel of the DL frequency hopping pattern.

2. The method of claim 1, wherein a selection of the UL frequency hopping pattern is based on the DL frequency hopping pattern and at least one of a cell identifier, a user equipment identifier (UE ID), or a group UE identifier.

3. The method of claim 2, wherein the at least one of the cell identifier, the UE ID, or the group UE identifier is received in one or more of a radio resource control (RRC) configuration, a downlink control information (DCI) message, or the DRS.

4. The method of claim 1, wherein the DL frequency hopping pattern comprises a cell-specific frequency hopping pattern, the method further comprising:
    applying a constant offset in modulo to the DL frequency hopping pattern to derive the UL frequency hopping pattern from the DL frequency hopping pattern.

5. The method of claim 1, wherein the DL frequency hopping pattern comprises a cell-specific frequency hopping pattern, and the UL frequency hopping pattern is based on the DL frequency hopping pattern, a user equipment identifier (UE ID), and a slot index.

6. The method of claim 1, further comprising:
    transmitting at least a portion of the UL data using configured grant (CG) resources based on not detecting the signal within a time period.

7. The method of claim 1, wherein the signal comprises one or more of a system information channel occupancy time (SI-COT), a group-common physical downlink control channel (GC-PDCCH), or a common transmit preamble.

8. The method of claim 1, wherein the DRS is received over an anchor channel of an unlicensed frequency band.

9. The method of claim 1, wherein the UE receives the DL data on the first hopping channel of the DL frequency hopping pattern concurrently with transmitting the UL data on the first hopping channel of the UL frequency hopping pattern.

10. The method of claim 1, wherein the first hopping channel of the UL frequency hopping pattern is configured to carry time-multiplexed UL data or frequency-multiplexed UL data transmitted from the UE and from one or more other UEs during a first COT period.

11. The method of claim 1, wherein the COT is obtained based on a clear channel assessment (CCA) on the first hopping channel of the DL frequency hopping pattern.

12. A wireless communication device, comprising:
    an interface configured to:
        obtain a discovery reference signal (DRS) indicating a downlink (DL) frequency hopping pattern; and
    a processing system configured to:
        select an uplink (UL) frequency hopping pattern based on the DL frequency hopping pattern, wherein a first hopping channel of the UL frequency hopping pattern is based on, and different from, a first hopping channel of the DL frequency hopping pattern; and
    the interface further configured to:
        obtain a signal indicating a channel occupancy time (COT) obtained by a base station on the first hopping channel of the DL frequency hopping pattern;
        obtain DL data on the first hopping channel of the DL frequency hopping pattern; and
        output UL data for transmission on the first hopping channel of the UL frequency hopping pattern.

13. The wireless communication device of claim 12, wherein the selection of the UL frequency hopping pattern is based on the DL frequency hopping pattern and at least one of a cell identifier, a user equipment identifier (UE ID), or a group UE identifier.

14. The wireless communication device of claim 12, wherein the DL frequency hopping pattern comprises a cell-specific frequency hopping pattern, and selecting the UL frequency hopping pattern comprises applying a constant offset in modulo to the DL frequency hopping pattern to derive the UL frequency hopping pattern from the DL frequency hopping pattern.

15. The wireless communication device of claim 12, wherein the DL frequency hopping pattern comprises a cell-specific frequency hopping pattern, and the UL frequency hopping pattern is based on the DL frequency hopping pattern, a user equipment identifier (UE ID), and a slot index.

16. The wireless communication device of claim 12, wherein the wireless communication device receives the DL data on the first hopping channel of the DL frequency hopping pattern concurrently with transmitting the UL data on the first hopping channel of the UL frequency hopping pattern.

17. A method for wireless communication performed by an apparatus of a base station (BS), comprising:
transmitting a discovery reference signal (DRS) over an unlicensed frequency band, the DRS indicating a downlink (DL) frequency hopping pattern;
transmitting a signal indicating a channel occupancy time (COT) obtained on a first hopping channel of the DL frequency hopping pattern;
transmitting DL data on the first hopping channel of the DL frequency hopping pattern; and
receiving uplink (UL) data on a first hopping channel of an UL frequency hopping pattern, wherein the first hopping channel of the UL frequency hopping pattern is based on, and different from, the first hopping channel of the DL frequency hopping pattern.

18. The method of claim 17, wherein a selection of the UL frequency hopping pattern is based on the DL frequency hopping pattern and at least one of a cell identifier, a user equipment identifier (UE ID), or a group UE identifier.

19. The method of claim 17, wherein the DL frequency hopping pattern comprises a cell-specific frequency hopping pattern, the method further comprising:
applying a constant offset in modulo to the DL frequency hopping pattern to derive the UL frequency hopping pattern from the DL frequency hopping pattern.

20. The method of claim 17, wherein the DL frequency hopping pattern comprises a cell-specific frequency hopping pattern, and the UL frequency hopping pattern is based on the DL frequency hopping pattern, a user equipment identifier (UE ID), and a slot index.

21. The method of claim 17, wherein the signal comprises one or more of a system information channel occupancy time (SI-COT), a group-common physical downlink control channel (GC-PDCCH), or a common transmit preamble.

22. The method of claim 17, wherein transmitting the DL data further comprises:
contending for access to the first hopping channel of the DL frequency hopping pattern using a clear channel assessment (CCA) procedure; and
switching to another hopping channel of the DL frequency hopping pattern after a number of unsuccessful CCA procedures on the first hopping channel of the DL frequency hopping pattern.

23. The method of claim 17, wherein the first hopping channel of the UL frequency hopping pattern is configured to carry time-multiplexed UL data or frequency-multiplexed UL data transmitted from a user equipment (UE) and from one or more other UEs during a first COT period.

24. The method of claim 17, further comprising:
selecting a plurality of unique UL frequency hopping patterns; and
allocating each unique UL frequency hopping pattern of the plurality of unique UL frequency hopping patterns to a respective user equipment (UE) of a plurality of UEs.

25. The method of claim 24, wherein each unique UL frequency hopping pattern is based at least in part on the DL frequency hopping pattern and a unique identifier of the respective UE.

26. A wireless communication device, comprising:
an interface configured to:
output a discovery reference signal (DRS) for transmission over an unlicensed frequency band, the DRS indicating a downlink (DL) frequency hopping pattern and an identifier; and
a processing system configured to:
select an uplink (UL) frequency hopping pattern based on the DL frequency hopping pattern, wherein a first hopping channel of the UL frequency hopping pattern is based on, and different from, a first hopping channel of the DL frequency hopping pattern; and
the interface further configured to:
output a signal indicating a channel occupancy time (COT) obtained on the first hopping channel of the DL frequency hopping pattern;
output DL data for transmission on the first hopping channel of the DL frequency hopping pattern; and
obtain UL data on the first hopping channel of the UL frequency hopping pattern.

27. The wireless communication device of claim 26, wherein the selection of the UL frequency hopping pattern is based on the DL frequency hopping pattern and at least one of a cell identifier, a user equipment identifier (UE ID), or a group UE identifier.

28. The wireless communication device of claim 26, wherein the interface is further configured to:
contend for access to the first hopping channel of the DL frequency hopping pattern using a clear channel assessment (CCA) procedure; and
switch to another hopping channel of the DL frequency hopping pattern after a number of unsuccessful CCA procedures on the first hopping channel of the DL frequency hopping pattern.

29. The wireless communication device of claim 26, wherein the processing system is further configured to:
select a plurality of unique UL frequency hopping patterns; and
allocate each unique UL frequency hopping pattern of the plurality of unique UL frequency hopping patterns to a respective user equipment (UE) of a plurality of UEs.

30. The wireless communication device of claim 29, wherein each unique UL frequency hopping pattern is based at least in part on the DL frequency hopping pattern and a unique identifier of the respective UE.

* * * * *